United States Patent
Mathews

(10) Patent No.: US 7,720,626 B2
(45) Date of Patent: May 18, 2010

(54) MODEL-BASED DISSIMILARITY INDICES FOR HEALTH MONITORING SYSTEMS

(75) Inventor: V. John Mathews, Salt Lake City, UT (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/235,142

(22) Filed: Sep. 22, 2008

(65) Prior Publication Data

US 2010/0076743 A1    Mar. 25, 2010

(51) Int. Cl.
*G01C 25/00* (2006.01)
(52) U.S. Cl. .................. 702/116; 116/200; 600/544; 600/546; 700/9; 702/66; 702/182
(58) Field of Classification Search ............ 702/57, 702/66, 81, 116, 182; 700/9; 600/544, 546; 116/200

See application file for complete search history.

(56) References Cited

U.S. PATENT DOCUMENTS 6,484,132 B1 * 11/2002 Hively et al. ............... 702/190
7,374,539 B2 * 5/2008 Fernando et al. ........... 600/454
7,487,059 B2 * 2/2009 Davis et al. ................. 702/116
7,552,027 B2 * 6/2009 Kearns et al. ............... 702/182

OTHER PUBLICATIONS

U.S. Appl. No. 12/135,591, filed Jun. 9, 2008, Ihn et al.

* cited by examiner

*Primary Examiner*—Eliseo Ramos Feliciano
*Assistant Examiner*—Elias Desta
(74) *Attorney, Agent, or Firm*—Yee & Associates, P.C.; Baldwin D. Quan

(57) ABSTRACT

A method, apparatus, and computer program product for identifying dissimilarity indices for a structure is presented. A first test signal is sent into a baseline model of the structure. An estimated response signal to the first test signal sent into the baseline model of the structure is received. A second test signal is sent into the structure. A second response single to the second test signal is received. A value is assigned to a model-based dissimilarity index using the first response compared to the second response.

21 Claims, 12 Drawing Sheets

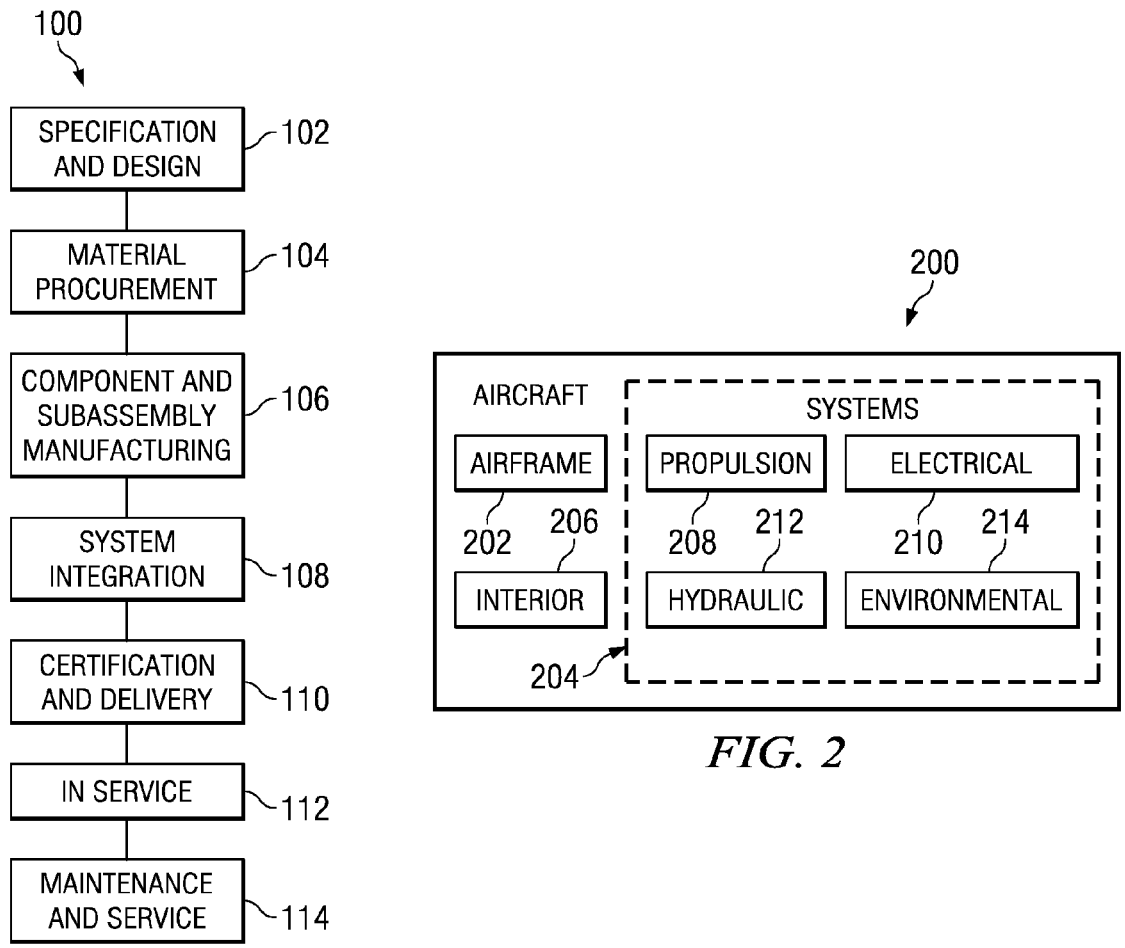
FIG. 1
FIG. 2
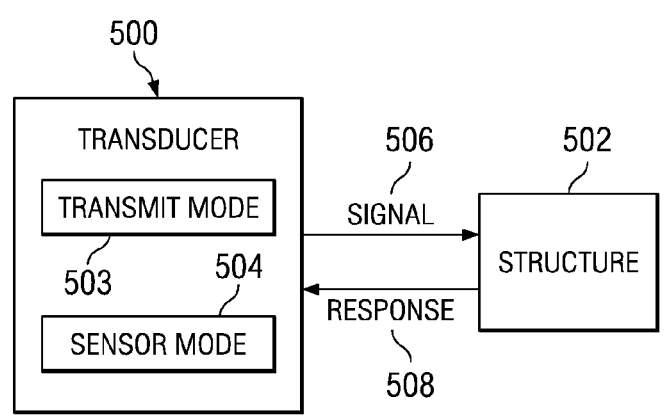
FIG. 5

MODEL-BASED DISSIMILARITY INDICES FOR HEALTH MONITORING SYSTEMS

BACKGROUND INFORMATION

1. Field

The present disclosure relates generally to processing data and in particular to processing data from responses of a structure to an input wave form. Still more particularly, the present disclosure relates to a method, apparatus, and computer usable program code for identifying anomalies in a structure.

2. Background

Composite and metallic aircraft structures may be susceptible to internal changes that may occur from fatigue, impacts, and other events or conditions. Composite materials typically have a minimal visual indication of these types of changes. As a result, an aircraft may be inspected to assess the integrity of the structure on a periodic basis or after visual indications of surface anomalies, such as, for example, dents and scratches.

For example, impacts to a structure, such as an aircraft, may occur during cargo loading and unloading. Inspections of the structure of an aircraft may be time-consuming and costly in terms of the time and skill needed to perform the inspection. Further, an airline may incur lost revenues from the aircraft being out of service.

Health monitoring techniques have been developed and used to monitor structures. These techniques often build the health monitoring systems into the structures. These health monitoring systems may be used to determine whether changes have occurred to these materials and structures over time.

Sudden changes in environment, such as, for example, electromagnetic effects, mechanical stresses, and other environmental effects, may affect the integrity of various materials and structures over time. By having health monitoring systems built into or associated with the structures to monitor the structures during use, appropriate measures and responses may be taken to prevent catastrophic failures and prolong the life span of these structures.

The monitoring of structures may include various non-destructive evaluation methods, such as ultrasonic testing or x-ray testing. Ultrasonic testing uses contact-based transducers to mechanically scan a structure. These distributed sensors and transmitters may be surface mounted on the structure or may be embedded in the structure to generate and propagate control of diagnostic signals into the structure being monitored.

A structural health monitoring system is based on using a transmitter and a sensor configuration to transmit waveforms at various frequency ranges and acquire data from the responses. Oftentimes, transducers may function both as a transmitter and a sensor. In some instances, a health monitoring system may only listen for signals.

The responses acquired from a structure may be compared to a baseline signal acquired at a prior time. The differences between a baseline signal and the response from a test signal may be characterized using dissimilarity indices. Commonly employed dissimilarity indices may have a number of drawbacks. These types of dissimilarity indices typically require that the excitation or test signals sent into the structure are identical for both the baseline and test measurements. Additionally, the range of values for dissimilarity indices is not easily bounded. Further, these types of indices also may have a path length dependent behavior.

Therefore, it would be advantageous to have a method and apparatus that overcomes one or more of the problems described above.

SUMMARY

In one advantageous embodiment, a method for identifying dissimilarity indices for a structure is presented. A first test signal is sent into a baseline model of the structure. A first response signal to the first test signal sent into the baseline model of the structure is received. A second test signal is sent into the structure. A second response signal to the second test signal is received. A value is assigned to a dissimilarity index using the first response signal, the second response signal, and a dissimilarity index equation.

In another advantageous embodiment, an apparatus comprises a structure having a plurality of components, a set of transmitters, a set of sensors, and a structural health monitoring system. The set of transmitters is physically associated with the plurality of components, wherein the set of transmitters is capable of sending signals into the plurality of components. The set of sensors is physically associated with the plurality of components, wherein the set of sensors is capable of detecting responses to the signals. The structural health monitoring system is in communication with the set of transmitters and the set of sensors. The structural health monitoring system is capable of sending a first test signal into a baseline model of a structure and receiving an estimated response signal to the second test signal sent into the baseline model of the structure. The structural health monitoring system is capable of sending a second test signal into the structure and receiving a second response signal to the second test signal sent to the structure, as well as assigning a value to a model-based dissimilarity index using the first response compared to the second response.

In yet another advantageous embodiment, a computer program product for identifying dissimilarity indices for a structure is presented. The computer program product comprises a computer recordable storage medium and program code storage on the computer recordable storage medium. Program code is present for sending a first test signal into a baseline model of a structure. Program code is also present for receiving an estimated response signal to the first test signal sent into the baseline model of the structure. Program code is present for sending a second test signal into the structure. Program code is also present or receiving a second response signal to the second test signal sent into the structure. In addition, program code is present for assigning a value to a model-based dissimilarity index using the first response signal compared to the second response signal.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 1 is a diagram illustrating an aircraft manufacturing and service method in which an advantageous embodiment may be implemented;

FIG. 2 is a diagram of an aircraft in accordance with an advantageous embodiment;

FIG. 5 is a diagram illustrating signal transmission and detection in accordance with an advantageous embodiment;

DETAILED DESCRIPTION

Figure 3:
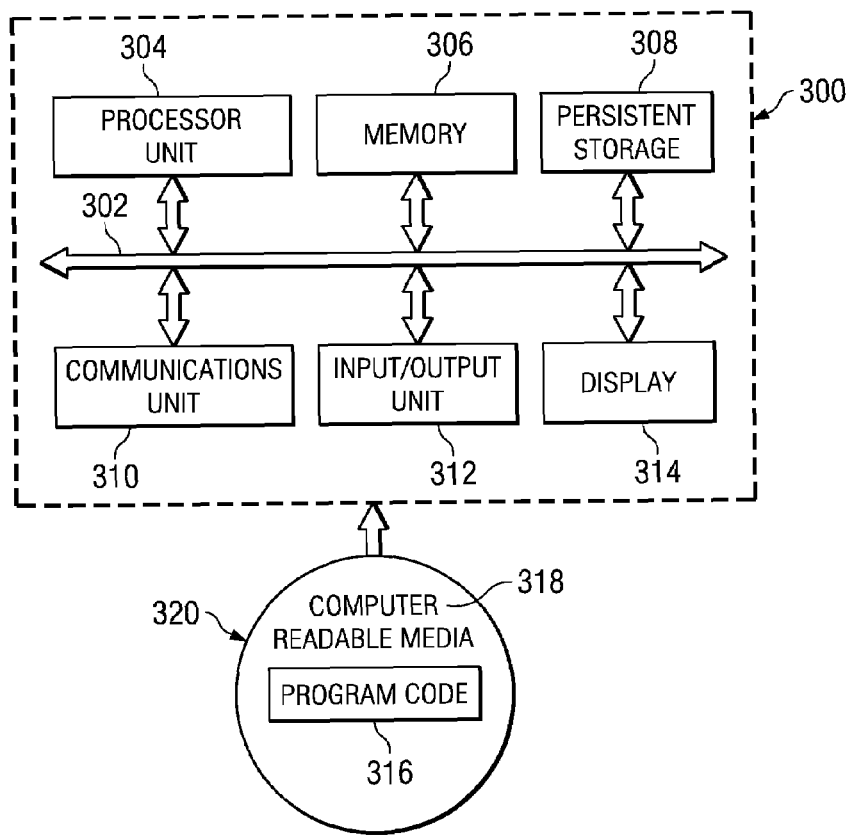
FIG. 3 is a diagram of a data processing system in accordance with an advantageous embodiment.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

In one illustrative example, health monitoring systems of the advantageous embodiments may be implemented during component and subassembly manufacturing 106 in system integration 108. In other advantageous embodiments, health monitoring systems may be added or implemented during maintenance and service 114. In these different advantageous embodiments, these health monitoring systems may include methods and apparatus for identifying anomalies in a structure in which dissimilarity indices are identified during monitoring.

Turning now to FIG. 3, a diagram of a data processing system is depicted in accordance with an advantageous embodiment. In these examples, data processing system 300 may implement processes to calculate dissimilarity indices in accordance with advantageous embodiments. These dissimilarity indices may be used to determine whether an anomaly or change is present in a structure. In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices. A storage device is any piece of hardware that is capable of storing information either on a temporary basis and/or a permanent basis. Memory 306, in these examples, may be, for example, a random access memory or any other suitable volatile or non-volatile storage device.

Persistent storage 308 may take various forms depending on the particular implementation. For example, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communications links.

Input/output unit 312 allows for input and output of data with other devices that may be connected to data processing system 300. For example, input/output unit 312 may provide a connection for user input through a keyboard and mouse. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306.

These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 316 is located in a functional form on computer readable media 318 that is selectively removable and may be loaded onto or transferred to data processing system 300 for execution by processor unit 304. Program code 316 and computer readable media 318 form computer program product 320 in these examples.

In one example, computer readable media 318 may be in a tangible form, such as, for example, an optical or magnetic disc that is inserted or placed into a drive or other device that is part of persistent storage 308 for transfer onto a storage device, such as a hard drive that is part of persistent storage 308.

In a tangible form, computer readable media 318 also may take the form of a persistent storage, such as a hard drive, a thumb drive, or a flash memory that is connected to data processing system 300. The tangible form of computer readable media 318 is also referred to as computer recordable storage media. In some instances, computer readable media 318 may not be removable.

Alternatively, program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown.

As one example, a storage device in data processing system 300 is any hardware apparatus that may store data. Memory 306, persistent storage 308, and computer readable media 318 are examples of storage devices in a tangible form.

In another example, a bus system may be used to implement communications fabric 302 and may be comprised of one or more buses, such as a system bus, or an input/output bus. Of course, the bus system may be implemented using any suitable type of architecture that provides for a transfer of data between different components or devices attached to the bus system.

Additionally, a communications unit may include one or more devices used to transmit and receive data, such as a modem or a network adapter. Further, a memory may be, for example, memory 306 or a cache such as found in an interface and memory controller hub that may be present in communications fabric 302.

The different advantageous embodiments recognize that when monitoring a structure with the health monitoring system, transducers may be sequentially excited to generate a test signal. A response signal to this test signal may be collected when the structure is in a healthy state as well as whenever inspections are necessary. A response signal acquired in response to a test signal may be referred to as a test signal. A response signal acquired when a structure is in a known healthy state may be referred to as a baseline response signal. This signal and any properties of the signal may also be referred to as a baseline.

A dissimilarity index is a metric used to characterize a difference and/or change between a baseline response signal and a test response signal obtained subsequent to the baseline. A dissimilarity index may be associated with every transmitter and sensor pair within an array of transducers in a health monitoring system.

The different advantageous embodiments recognize that commonly used dissimilarity indices such as a root mean square (RMS) error between the baseline response signal and a test response signal may have a number of drawbacks. The different advantageous embodiments recognize that these types of dissimilarity indices require that the test signals are identical for both the baseline and the subsequent test measurement.

Further, the different advantageous embodiments recognize that the range of values of dissimilarity indices may not be easily bounded. The different advantageous embodiments also recognize that dissimilarity indices also may have a path length dependent behavior. In other words, the value of the dissimilarity indices may vary as a function of the path length in addition to whether any differences are present between the baseline response signal and any subsequent test response signal.

Thus, the different advantageous embodiments provide a method, apparatus, and computer program code for a class of dissimilarity indices that may overcome one or more of these problems. The dissimilarity indices used in the different advantageous embodiments are model-based dissimilarity indices. A first test signal is sent into a baseline model of the structure.

A response signal is received. This response signal is an estimated response. Using the response signal of the structure to the first test signal and the test signal itself, a baseline model for the wave propagation between each transmitter-sensor pair is estimated. A second test signal is then sent into the structure.

Depending on the particular implementation, sending a second test signal into the structure may involve sending a test signal directly into the structure. In other advantageous embodiments, a model of the structure is generated from responses to sending test signals sent into the structure, and an estimate of the response signal is obtained by processing the input signal with the model.

In these examples, the baseline model is a baseline model of wave propagation. A second response signal to the second test signal sent into the structure is received. An estimated response signal to the second test signal is computed using the baseline model. A value is assigned to a model-based dissimilarity index using the second response signal and the estimated response signal of the baseline model to the second test signal. This value is assigned using a dissimilarity index equation.

A dissimilarity index equation is an equation that generates a value for a dissimilarity index based on responses from a model, such as, for example, a baseline model. Of course, depending on the particular dissimilarity index equation used, responses may also be obtained from a model of a structure being tested. This model of the structure is based on data obtained from test signals sent into the structure.

In these examples, the sending of the second test signal into the structure may be performed by sending a test signal into the structure at a later point in time from when the baseline response signal was obtained.

Figure 4:
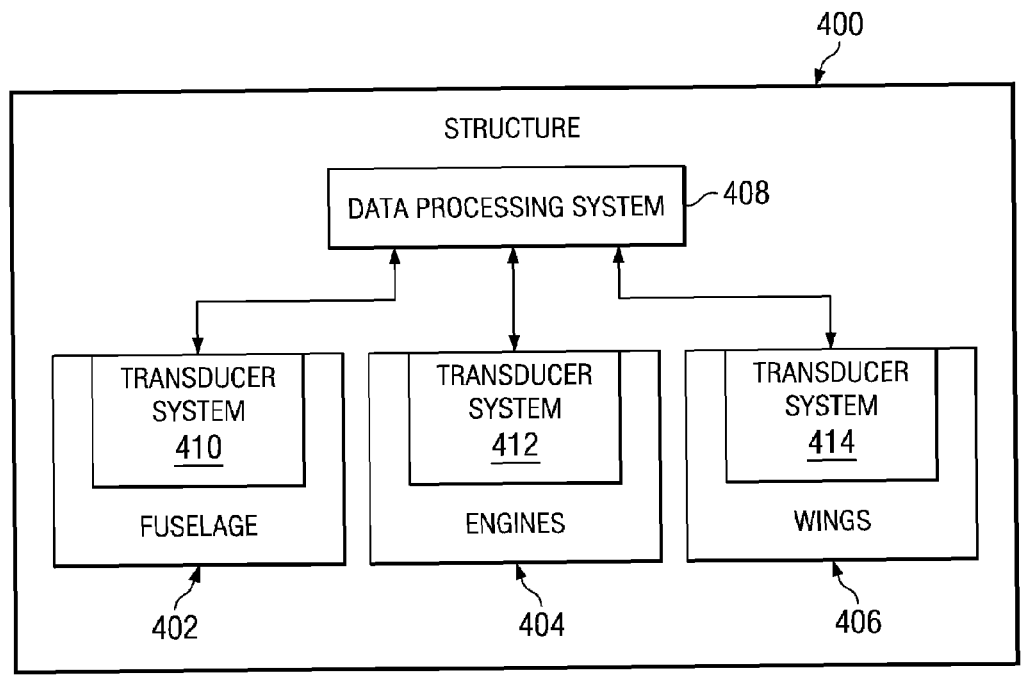
FIG. 4 is a diagram illustrating components used for structural health monitoring in a structure in accordance with an advantageous embodiment.

Turning now to FIG. 4, a diagram illustrating components used for health monitoring in a structure is depicted in accordance with an advantageous embodiment. Structure 400 is an example of a structure in which a health monitoring system may be implemented. Structure 400 may take many forms, such as, for example, an aircraft, a stationary platform, a land-based structure, an aquatic-based structure, a space-based structure, a mobile platform, or some other suitable object. Specific examples of some of these types of objects include, for example, without limitation, a car, an armored personnel carrier, a surface ship, a submarine, a space station, a dam, a power plant, a bridge, or some other suitable object.

In these examples, structure 400 takes the form of an aircraft. Structure 400 includes fuselage 402, engines 404, and wings 406. Other components also may be found in structure 400, but only these depicted ones are presented for purposes of illustrating different features in the different advantageous embodiments.

Structure 400 also includes data processing system 408, transducer system 410, transducer system 412, and transducer system 414. In these examples, data processing system 408, transducer system 410, transducer system 412, and transducer system 414 are for a structural health monitoring system. Although transducers are normally used for transmitters and sensors, in these examples, any type of transmitter, sensor, or device that is capable of sending and detecting signals at the frequencies needed to transmit the signals into a material may be used.

Data processing system 408 may be implemented in structure 400 using a data processing system, such as data processing system 300 in FIG. 3. Data processing system 408 may take the form of software, hardware, or a combination of software and hardware.

Transducer systems 410, 412, and 414 are examples of transmitters and sensors that may be implemented in structure 400 to transmit signals and detect responses to those signals. In these examples, the transducers in these systems are "associated" with particular components in structure 400.

A transmitter or sensor, such as those in transducer systems 410, 412, and 414, may be physically associated with the component by being attached to the component or even embedded within the component. In these examples, the transducers are fixed transmitters and fixed sensors that are not moved once they are placed. In particular, these transducers may perform or function both as transmitters and sensors.

In this depicted example, transducer system 410 is a set of one or more transducers that is placed onto or within fuselage 402. Transducer system 410 may be attached to surfaces within fuselage 402 or may be embedded into the materials itself, depending on the particular implementation.

The different transducers within transducer system 410 are arranged to be capable of monitoring one or more areas within fuselage 402. These areas may be selected based on different factors, such as, for example, identifying areas in which damage may cause a failure within fuselage 402. In a similar fashion, transducer system 412 is attached to or integrated with components in engines 404. Transducer system 414 is integrated and configured to collect data from one or more areas in wings 406.

Transducer systems 410, 412, and 414 are controlled by data processing system 408. Data processing system 408 may send signals for transmission by these transducer systems. Further, the response signals received in response to these signals are returned to data processing system 408 for processing. The response signals collected from transducer systems 410, 412, and 414 are compared to a baseline. In other advantageous embodiments, a property of a response signal may be compared to a corresponding property in the baseline. In these illustrative examples, a property may be the time of arrival of one or more modes of propagation for the signal.

In these examples, the transducers within transducer systems 410, 412, and 414 may be operated in different modes. For example, a pitch and catch mode may be used in which all of the transducers, other than the transducer that is selected to transmit the signal, act as sensors. In a pulse echo mode of operation, a transducer may switch from transmitting a signal as a transmitter to receiving a response signal to the signal as a sensor. In this manner, the transducer may acquire the response signals that are returned.

The illustration of structure 400 in FIG. 4 is presented for the purposes of explaining one advantageous embodiment. This illustration is not meant to limit the manner in which different advantageous embodiments may be implemented or embodied. For example, in other advantageous embodiments, other numbers of transducer systems may be present. For example, structure 400 may include five, ten, twenty, or some other suitable number of transducer systems depending on the particular implementation. Also, additional structural health monitoring systems, in addition to data processing system 408, also may be present for redundancy.

Turning now to FIG. 5, a diagram illustrating signal transmission and detection is depicted in accordance with an advantageous embodiment. In this example, transducer 500 may be used to test structure 502. Transducer 500 is an example of a transducer that may be found in transducer systems 410, 412, and 414 in FIG. 4. Structure 502 is an example of a material that may be present in a structure, such as fuselage 402, engines 404, or wings 406 in FIG. 4.

Transducer 500 may include two modes of operation. In this example, transducer 500 includes transmit mode 503 and sensor mode 504. Transmit mode 503 may be used to transmit or send signal 506 into structure 502 while transducer 500 is in transmit mode 503. Signal 506 is a waveform having a selected frequency range. In these examples, transducer 500 switches from transmit mode 503 to sensor mode 504 after signal 506 is transmitted.

Response 508 is detected by transducer 500 while transducer 500 is in sensor mode 504. Response 508 is generated in response to the transmission of signal 506 into structure 502. With this configuration, response 508 is detected from the reflections or scattering of signal 506 being transmitted into structure 502.

Response 508 is used, in these different illustrative examples, in a comparison with a prior response to determine whether changes have occurred in structure 502. These changes may be anomalies that occur through various stresses and other environmental conditions to which structure 502 is subjected to over time.

Figure 6:
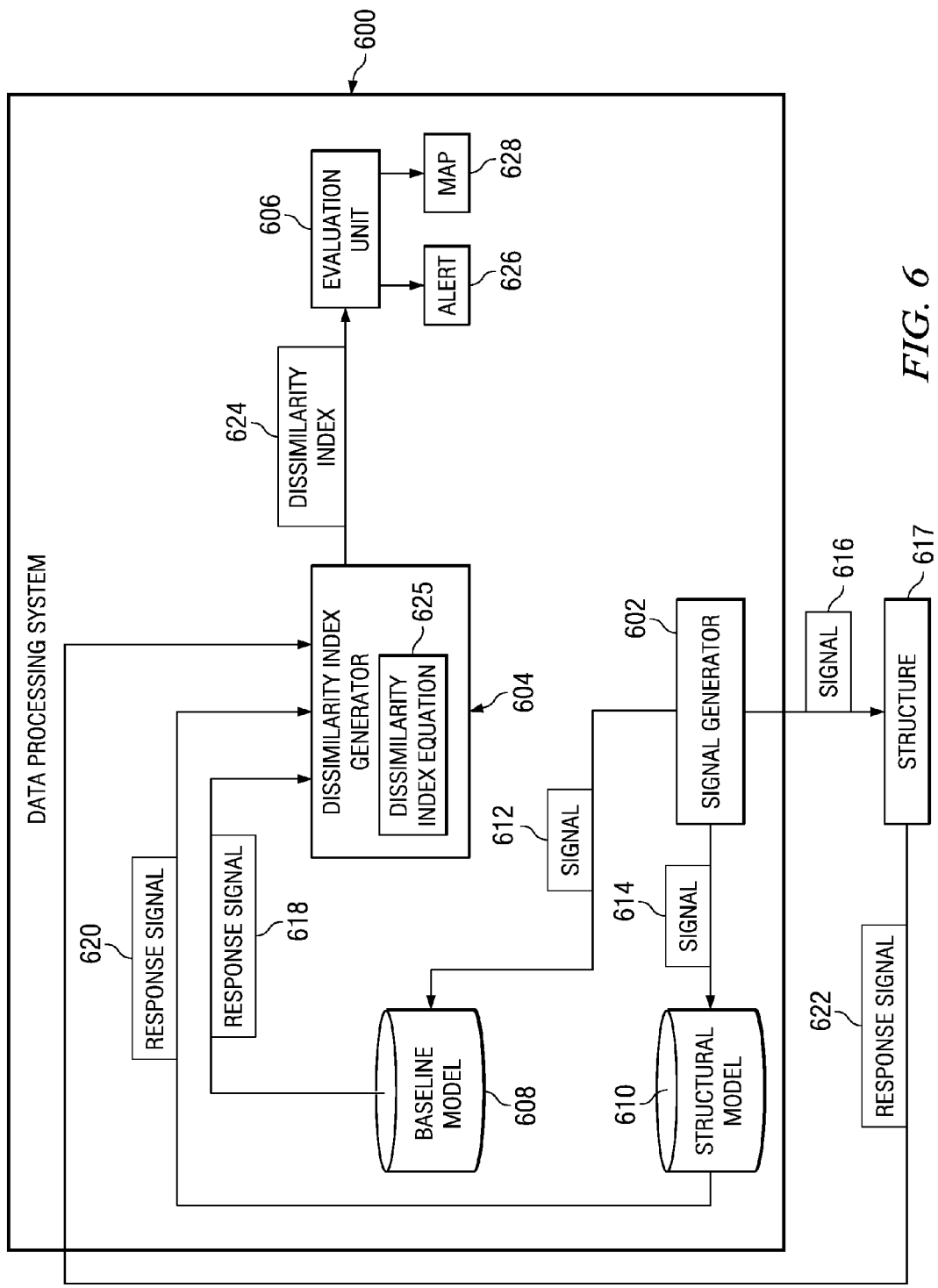
FIG. 6 is a diagram of a data processing system structural health monitoring system depicted in accordance with an advantageous embodiment.

With reference now to FIG. 6, a diagram of a data processing system for a structural health monitoring system is depicted in accordance with an advantageous embodiment. In this example, data processing system 600 is an example of one implementation of data processing system 408 in FIG. 4.

As illustrated, data processing system 600 includes signal generator 602, dissimilarity index generator 604, evaluation unit 606, baseline model 608, and structural model 610.

Signal generator 602 generates test signals. In these examples, the test signals are signal 612, signal 614, and signal 616. Signal 612 is sent to baseline model 608, while signal 614 is sent to structural model 610. Signal 616 is sent into structure 617. Signal 612 and signal 614 may be data for a physical signal. Signal 616 may be a signal transmitted by a transducer such as, for example, transducer 500 in FIG. 5. Signal 612, signal 614, and signal 616 are identical to each other in these examples. Identical signals are used to obtain responses that are identical or sufficiently close to each other when changes have occurred.

In these examples, signals 612, 614, and 616 result in response signals 618, 620, and 622 being generated, respectively. Response signals 618 and 620 are estimated responses and may not be exact response because they are generated from baseline model 608 and structural model 610 in these examples. If response signal 618 and response signal 622 are sufficiently close to each other, then a change in structure 617 has not occurred. These response signals are received by dissimilarity index generator 604 and processed to generate dissimilarity index 624. In this illustrative example, dissimilarity index 624 may be one or more dissimilarity indices.

Dissimilarity index generator 604 generates dissimilarity index 624 using dissimilarity index equation 625. Dissimilarity index equation 625 may be an equation based on a model of structure 617, such as, for example, baseline model 608 and/or structural model 610. In other words, dissimilarity index equation 625 may use the responses from one or more of baseline model 608 and structural model 610 to generate dissimilarity index 624.

Baseline model 608 is a model of structure 617 in these examples. Baseline model 608 is a wave propagation model that is created from sending signals into structure 617 and receiving responses to those signals. This model is a model of structure 617 at some initial point in time. Baseline model 608 may be a model of structure 617 created sometime after the creation of structure 617. Structure 617, at the time data for baseline model 608 is acquired, may be referred to as a baseline structure. When structure 617 is tested after baseline model 608 is created, structure 617 may be referred to as a test structure.

Baseline model 608 generates response signal 618 in response to signal 612 to simulate or estimate the behavior of structure 617 to various signals that may be generated. Response signal 618 may be an estimate of the response.

In a similar fashion, structural model 610 is a model of structure 617 created at some point in time after baseline model 608. In a similar fashion, structural model 610 is a wave propagation model that is generated by sending test signals into structure 617 and receiving responses. This model is created based on the responses received from structure 617. Structural model 610 generates response signal 620 in response to receiving signal 614. Response signal 620 is an estimate of the response that would be generated by structure 617 from an actual test signal transmitted into structure 617.

Baseline model 608 and structural model 610 may be a set of equations and/or functions that generate an estimated response signal to an input signal. A model may provide estimated responses for a particular range of frequencies. The range frequencies may or may not be continuous depending on the particular implementation. Further, the particular range of frequencies selected may depend on the test signals that may be sent into or input into a model. In any event, baseline model 608 and structural model 610 are based on data obtained from structure 617.

In operation, the generation of dissimilarity indices for evaluation by evaluation unit 606 may be performed using baseline model 608 and structure 617. In other advantageous embodiments, dissimilarity index generator 604 may generate dissimilarity index 624 using baseline model 608 and structural model 610. More specifically, dissimilarity index generator 604 generates dissimilarity index 624 using dissimilarity index equation 625, which may be based off baseline model 608 and/or baseline structure model 610.

Dissimilarity index generator 604 may generate dissimilarity index 624 based on a comparison of response signal 618 from baseline model 608 and response signal 622 from structure 617. In other advantageous embodiments, dissimilarity index generator may generate a dissimilarity index using response signal 618 from baseline model 608 and response signal 620 from structural model 610.

Further, dissimilarity index generator 604 may process dissimilarity index 624 to generate a value for dissimilarity index 624 that may be substantially independent of the length of the path between a transmitter and sensor for a particular signal and response in both a model and the actual structure.

Once generated, dissimilarity index 624 may then be processed by evaluation unit 606.

Based on dissimilarity index 624, evaluation unit 606 may generate alert 626 if a change greater than a threshold value is detected. Additionally, evaluation unit 606 may generate map 628. Map 628 may be a map of a location for changes found within the structure. In one example, map 628 may include a two-dimensional or three-dimensional view of the structure along with indications or identifiers for points, regions, or sections within the structure in which changes have been identified.

In the different advantageous embodiments, the dissimilarity indices are based on models, such as baseline model 608 and structural model 610 that relate transmitter signals to sensor signals. This relation may be between the signals directly and/or corresponding to properties associated with the signals. In these examples, dissimilarity index 624 is a model-based dissimilarity index. In other words, dissimilarity index 624 is generated using dissimilarity index equation 625 from results that may involve at least one model of the baseline and the subsequent structure. In the different advantageous embodiments, both linear and/or non-linear models may be used.

In the illustrative examples, the model-based dissimilarity indices assume that data has been collected from and characterized by the properties of the original or initial structure, which are referred to as the baseline structure. For every path $p_{i,j}$ in the baseline structure, a model $H_{i,j}^{(b)}$ is created that relates the transmitter signal $x_i^{(b)}$ to the sensor signal $y_{i,j}^{(b)}(n)$ so that $$\hat{y}_{i,j}^{(b)}(n) = H_{i,j}^{(b)}\{x_i^{(b)}(n)\} \quad (1)$$

represents the best estimate of $y_{i,j}^{(b)}(n)$. In this example, the transmitter signal $x_i^{(b)}(n)$ may be, for example, signal 612, the sensor signal $y_{i,j}^{(b)}(n)$ may be response signal 618, and $$\hat{y}_{i,j}^{(b)}(n) = H_{i,j}^{(b)}\{x_i^{(b)}(n)\}$$

may be response signal 622. In these examples, $\hat{y}_{i,j}^{(b)}(n)$ is the estimate of a sensor signal $y_{i,j}^{(b)}(n)$., $H_{i,j}^{(b)}\{x_i^{(b)}(n)\}$ is a model, b indicates baseline data, i is a transmitter, j is a sensor, and n is the sample number. This estimate minimizes some non-negative and convex cost functions of the estimation error $$e_{i,j}^{(b)}(n) = y_{i,j}^{(b)}(n) - \hat{y}_{i,j}^{(b)}(n) \quad (2)$$

where $e_{i,j}^{(b)}(n)$ is an estimation error. One illustrative example of such a cost function is the least-squares error function defined as $$\sigma_{b,e_{i,j}}^2 = \frac{1}{N}\sum_{n=1}^{N}\left(e_{i,j}^{(b)}(n)\right)^2 \quad (3)$$

where $\sigma_{b,e_{i,j}}^2$ is the least-squares error and N is the number of samples contained in the sensor signal. The error magnitude and corresponding energy is a function of the signal magnitude. The signal magnitude may change with environmental and/or other data acquisition characteristics.

Consequently, the raw least-squares error function defined above may be modified prior to the use of the function in the design of dissimilarity indices. One possible modification is a normalized version of the least-squares error value obtained by normalizing $\sigma_{b,e_{i,j}}^2$ with the time averaged energy in the sensor signal given by $$\sigma_{b,y_{i,j}}^2 = \frac{1}{N}\sum_{n=1}^{N}\left(y_{i,j}^{(b)}(n)\right)^2 \quad (4)$$

The normalized least-squares modeling error is defined as $$J_{i,j}^{(b)} = \frac{\sigma_{b,e_{i,j}}^2}{\sigma_{b,y_{i,j}}^2} \quad (5)$$

where $J_{i,j}^{(b)}$ is the normalized least-squares modeling error.

Dissimilarity indices in these examples may be based on baseline models of wave propagation. With this type of approach, the dissimilarity index for the (i,j)th path is obtained by comparing the properties of that path in the baseline and test structures. In these depicted examples, $x_i^{(t)}(n)$ is the excitation signal for the ith transmitter on the test structure and $y_{i,j}^{(t)}(n)$ represents the jth sensor signal when the ith transmitter is excited. The baseline model $H_{i,j}^{(b)}$ is used to estimate the sensor signal $y_{i,j}^{(b)}(n)$ as:

$$\hat{y}_{i,j}^{(t)}(n) = H_{i,j}^{(b)}\{x_i^{(t)}(n)\} \quad (6)$$

In this example, the excitation signal $x_i^{(t)}(n)$ may be, for example, signal 614, and the sensor signal $y_{i,j}^{(t)}(n)$ may be signal 610.

The normalized least-squares modeling error for the test structure is calculated in a fashion similar to the corresponding calculation of the baseline structure, as follows:

$$J_{i,j}^{(t)} = \frac{\sigma_{t,e_{i,j}}^2}{\sigma_{t,y_{i,j}}^2} \text{ where} \quad (7)$$

$$\sigma_{t,e_{i,j}}^2 = \frac{1}{N}\sum_{n=1}^{N}\left(y_{i,j}^{(t)}(n) - H_{i,j}^{(b)}\{x_i^{(t)}(n)\}\right)^2 \text{ and} \quad (8)$$

$$\sigma_{t,y_{i,j}}^2 = \frac{1}{N}\sum_{n=1}^{N}\left(y_{i,j}^{(t)}(n)\right)^2 \quad (9)$$

Finally, the dissimilarity index for the (i,j)th path, based on the baseline model, is defined as the ratio of the normalized least-squares errors associated with the test structure and the baseline structure as follows:

$$D_0(i, j) = \frac{J_{i,j}^{(t)}}{J_{i,j}^{(b)}} \quad (10)$$

This equation is an example of one implementation for dissimilarity index equation 625 in FIG. 6.

A dissimilarity index also may be based on the unnormalized error measures as follows:

$$D_1(i, j) = \frac{\sigma_{t,e_{i,j}}^2}{\sigma_{b,e_{i,j}}^2} \quad (11)$$

This equation is another example of dissimilarity index equation 625 in FIG. 6. The above dissimilarity index equation $D_1$ may be useful only when the test signal does not change between the baseline data acquisition and the test data acquisition or the test signal has identical energy values at the time of baseline and test data acquisition. In these examples, the baseline data is a set of response signals generated by a set of test signals sent into the initial structure. The test data is a set of response signals received in response to sending a set of test signals into the structure at a later point in time.

If identical sets of test signals are used to collect the baseline data and the test data, the average value of the squared differences between the sensor signals in the baseline and in the test data sets may be used as another dissimilarity index. This dissimilarity index is defined as:

$$D_{rms}(i, j) = \sqrt{\frac{1}{N} \sum_{n=1}^{N} \left(y_{i,j}^{(b)}(n) - y_{i,j}^{(t)}(n)\right)^2} \quad (12)$$

This index is also referred to as a root mean square (RMS) dissimilarity index. While it may be easy to control the test signals used in laboratory environments, the different advantageous embodiments recognize that the signal characteristics can change with time, equipment, environment, human error, and other such variables. These changes can affect the root mean square dissimilarity index calculation significantly.

For example, a gain change in the data acquisition system between baseline and test data collection changes the root mean square dissimilarity index significantly. The dissimilarity index $D_0$ provides a certain amount of robustness to variations in the characteristics of the excitation signals used for baseline and test data acquisition.

In another advantageous embodiment, a model of a structure in an initial state and/or unchanged state may be used along with a model of the structure generated at a subsequent time from the initial model. In this approach, a model $H_{i,j}^{(t)}$ is created that describes the propagation of the excitation signal from the ith transmitter to the jth sensor during the test.

The dissimilarity indices are measures of the differences between the models of wave propagation in the baseline and test structures. In this example, the propagation model is assumed to be linear. $H_{i,j}^{(b)}(\omega)$ and $H_{i,j}^{(t)}(\omega)$ denote the frequency responses of the two linear systems that model the propagation of waves in the baseline and test structures, respectively. In these examples, $\omega$ represents a frequency. One comparison of the two systems is to evaluate the mean-squares difference between the two frequency responses as follows:

$$D(i, j) = \frac{1}{2\pi} \int_{-\pi}^{\pi} \|H_{i,j}^{(b)}(\omega) - H_{i,j}^{(t)}(\omega)\|^2 d\omega \quad (13)$$

In this example, $h_{i,j}^{(b)}(k)$ and $h_{i,j}^{(t)}(k)$ represent scaling factors corresponding to the attenuation associated with the path of the wave packet that arrives at the sensor with a delay of k samples for the baseline and test data, respectively. Using Parseval's theorem, D(i,j) can be expressed equivalently in the following equation:

$$D(i, j) = \sum_{k=0}^{P} \left(h_{i,j}^{(b)}(k) - h_{i,j}^{(t)}(k)\right)^2 \quad (14)$$

where P represents the maximum delay value used in the models.

If the structure is excited with white noise with zero mean value and unit variance or with a unit impulse signal, D(i,j) in equation (14) also satisfies the following expression:

$$D(i, j) = \sum_{n=1}^{N} \left(\hat{y}_{i,j}^{(t,b)}(n) - \hat{y}_{i,j}^{(t,t)}(n)\right)^2 \text{ where} \quad (15)$$

$$\hat{y}_{i,j}^{(t,t)}(n) = H_{i,j}^{(t)}\{x_i^t(n)\} \text{ and} \quad (16)$$

$$\hat{y}_{i,j}^{(t,b)}(n) = H_{i,j}^{(b)}\{x_i^{(t)}(n)\} \quad (17)$$

are the outputs of the system models $H_{i,j}^{(t)}$ and $H_{i,j}^{(b)}$ when the excitation used is $x^{(t)}(n)$. In general, employing white noise signals or impulsive signals is impractical. For arbitrary input signals, a dissimilarity index is defined using the same definition as in equation (15) as follows:

$$D_3(i, j) = \sum_{n=0}^{N} \left(\hat{y}_{i,j}^{(t,b)}(n) - \hat{y}_{i,j}^{(t,t)}(n)\right)^2 \quad (18)$$

The resulting dissimilarity index may be thought of as a frequency-weighted version of D(i,j) since Parseval's theorem may be used to find an equivalent representation in the following equation:

$$D_3(i, j) = \frac{1}{2\pi} \int_{-\pi}^{\pi} \|H_{i,j}^{(b)}(\omega)X_i^{(t)}(\omega) - H_{i,j}^{(t)}(\omega)X_i^{(t)}(\omega)\|^2 d\omega \quad (19)$$

This equation is another example of an implementation for dissimilarity index equation 625 in FIG. 6.

The different advantageous embodiments also recognize that with this dissimilarity index, the signal strength decreases with the length of the path and thus the dissimilarity index will also decrease in general as a function of the length of the path. Two normalized dissimilarity indices may be used as follows:

$$D_2(i, j) = \frac{\sum_{n=1}^{N} \left(\hat{y}_{i,j}^{(t,b)}(n) - \hat{y}_{i,j}^{(t,t)}(n)\right)^2}{\sqrt{\sum_{n=1}^{N} \left(\hat{y}_{i,j}^{(t,b)}(n)\right)^2 \sum_{n=1}^{N} \left(\hat{y}_{i,j}^{(t,t)}(n)\right)^2}} \text{ and} \quad (20)$$

-continued $$D_4(i, j) = 1 - \frac{\sum_{n=1}^{N} \hat{y}_{i,j}^{(t,b)}(n) \hat{y}_{i,j}^{(t,t)}(n)}{\sqrt{\sum_{n=1}^{N} \left(\hat{y}_{i,j}^{(t,b)}(n)\right)^2 \sum_{n=1}^{N} \left(y_{i,j}^{(t,t)}(n)\right)^2}} \quad (21)$$

These two equations are still other examples of implementations for dissimilarity index equation 625 in FIG. 6.

The quantity that is subtracted from 1 in the definition of $D_4(i,j)$ is a correlation coefficient. Since correlation coefficients are always between −1 and 1, the range of $D_4(i,j)$ is [0,2], with 0 corresponding to the initial condition. These equations may be referred to more succinctly as follows, for example, $D_2(i, j)$ may be referred to as dissimilarity index equation $D_2$, while $D_4(i,j)$ may be referred to as dissimilarity index equation $D_4$, rather than referring to the entire equation in equations 20 and 21.

The dissimilarity index $D_4$ is a dissimilarity index generated using dissimilarity index equation $D_4(i,j)$ and is close to an appropriately normalized value of the mean-square difference between the sensor signals in the baseline and test cases when the excitation signals are identical. The dissimilarity index $D_4$ has the advantage that it is much more robust to changes in the excitation signals between the baseline and test measurements. It further has the advantage that $D_4$ is bound between 0 and 2, and therefore it is easier to make threshold choices for identifying changes in the structure. For all these reasons, $D_4$ is a better alternate to the normalized RMS dissimilarity index and related measures in structural health management applications.

Because of their possible robustness to variations in signal strength, dissimilarity index equations $D_0$, $D_2$, and $D_4$ are the examples used.

Figure 7:
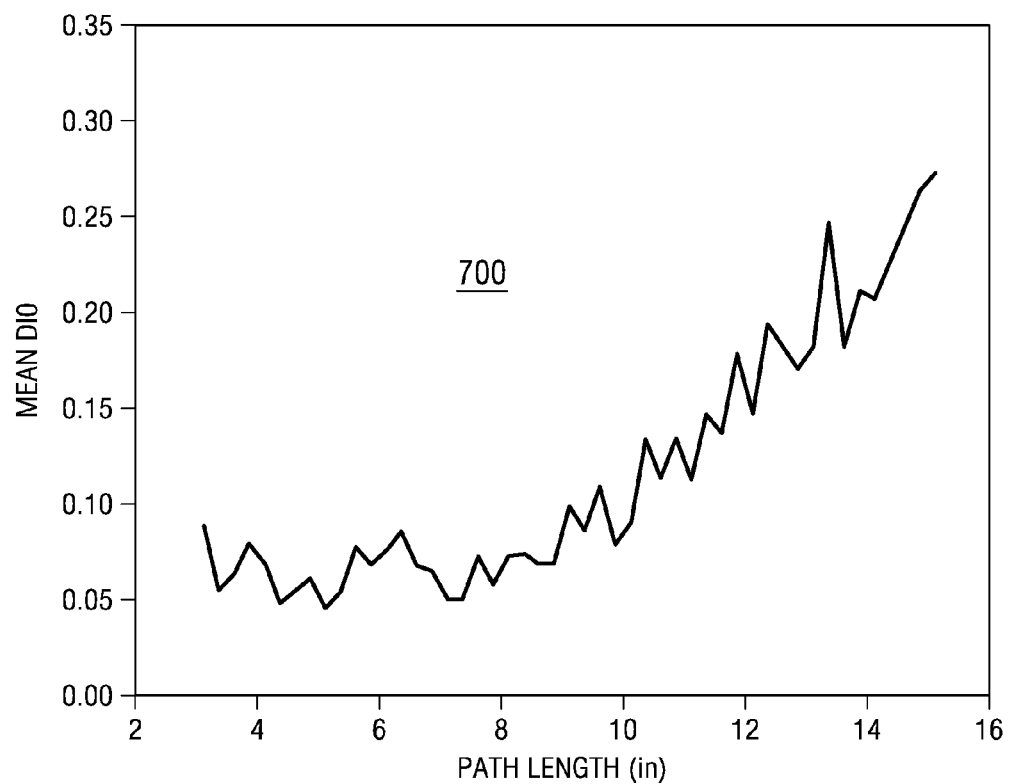
FIG. 7 is a diagram illustrating mean values for dissimilarity indices depicted in accordance with an advantageous embodiment.

With reference now to FIG. 7, a diagram illustrating mean values for dissimilarity indices is depicted in accordance with an advantageous embodiment. In graph 700, the x axis represents the path length while the y axis represents the mean value for a dissimilarity index. Graph 700 displays mean values for dissimilarity index $D_0$ prior to any impact or change in the structure as a function of path length.

Figure 8:
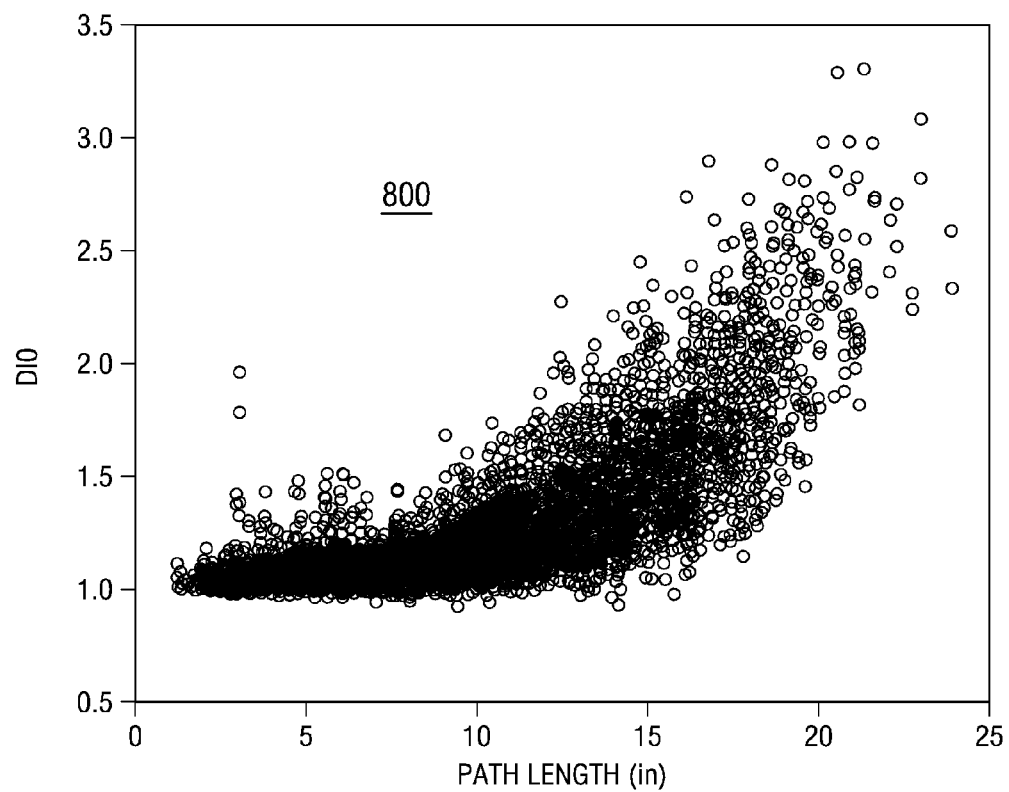
FIG. 8 is a scatter diagram of dissimilarity index values generated from a model depicted in accordance with an advantageous embodiment.

With reference now to FIG. 8, a scatter diagram of dissimilarity index values generated from dissimilarity index equation $D_0$ is depicted in accordance with an advantageous embodiment. In this example, the dissimilarity index values in graph 800 are plotted against the path length. Graph 800 was generated using dissimilarity index equation $D_0$. The x axis represents the path length, while the y axis represents the dissimilarity index value.

Baseline data and test data measurements were made for generating these graphs. In other words, test signals were sent into a structure and responses received for those test signals at an initial point in time were used to obtain baseline data. At a later point in time, signals are again sent into the same structure, and responses may be measured to obtain test data measurements.

In these examples, no changes in the structure occurred between the two sets of data acquisition. The analysis of these two sets of data allows for a characterization of the effect of path length on the dissimilarity indices. Based on the results in 700 and 800, this effect can be accurately modeled as an exponential increase of the dissimilarity index with increasing path length.

Figure 9:
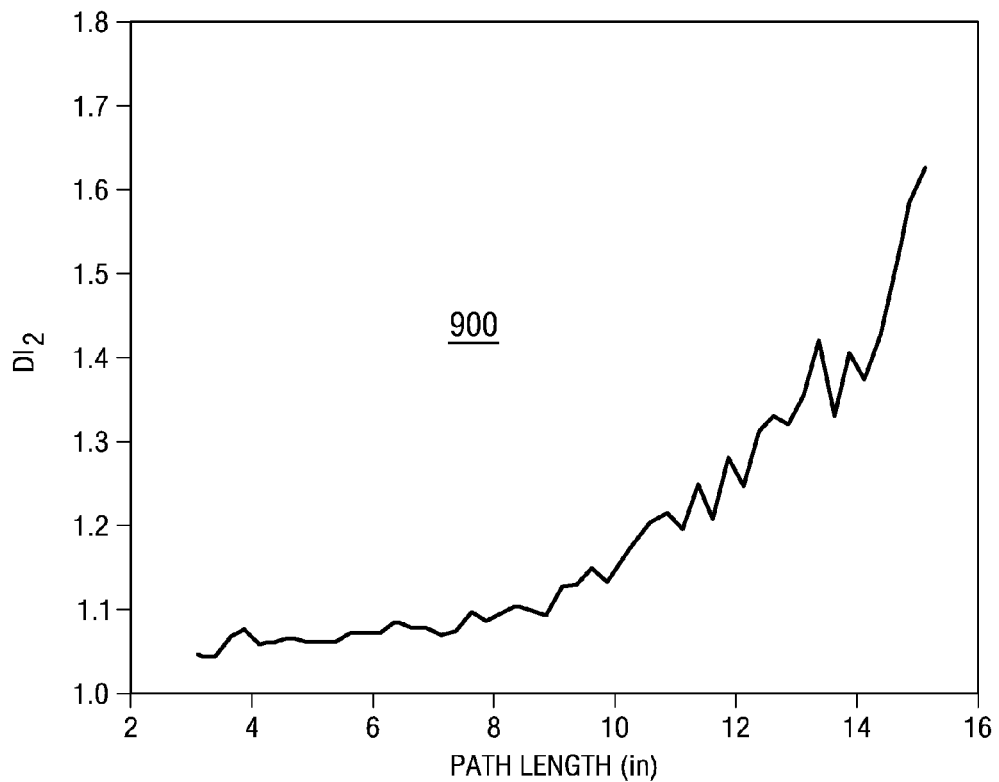
FIG. 9 is a diagram illustrating mean values of dissimilarity indices depicted in accordance with an advantageous embodiment.

With reference now to FIG. 9, a diagram illustrating mean values of dissimilarity indices is depicted in accordance with an advantageous embodiment. In graph 900, the x axis represents the path length, while the y axis represents the mean value for a dissimilarity index.

Figure 10:
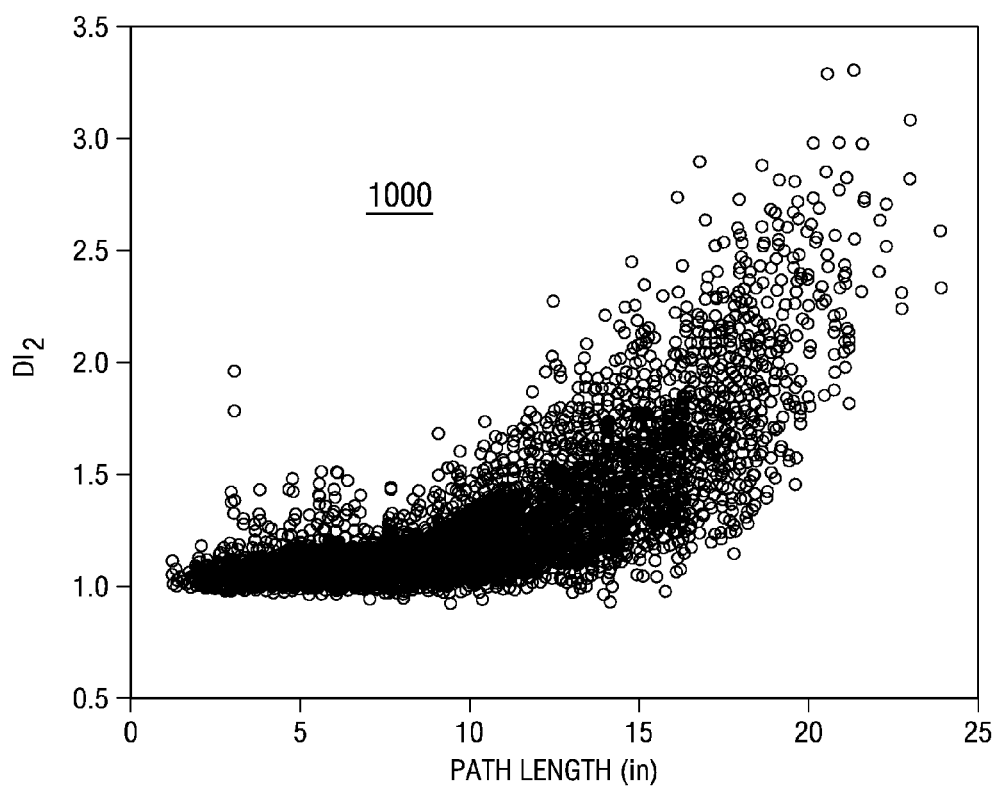
FIG. 10 is a scatter diagram of dissimilarity indices depicted in influence with an advantageous embodiment.

With reference now to FIG. 10, a scatter diagram of dissimilarity indices is depicted in an advantageous embodiment. In graph 1000, the x axis represents the path length, while the y axis represents the dissimilarity index value. These values are examples of how dissimilarity index equation $D_2$ generates values that vary with the path length when there is no change in the structure. As can be seen in this example, these values also increase exponentially as a function of path length.

Figure 11:
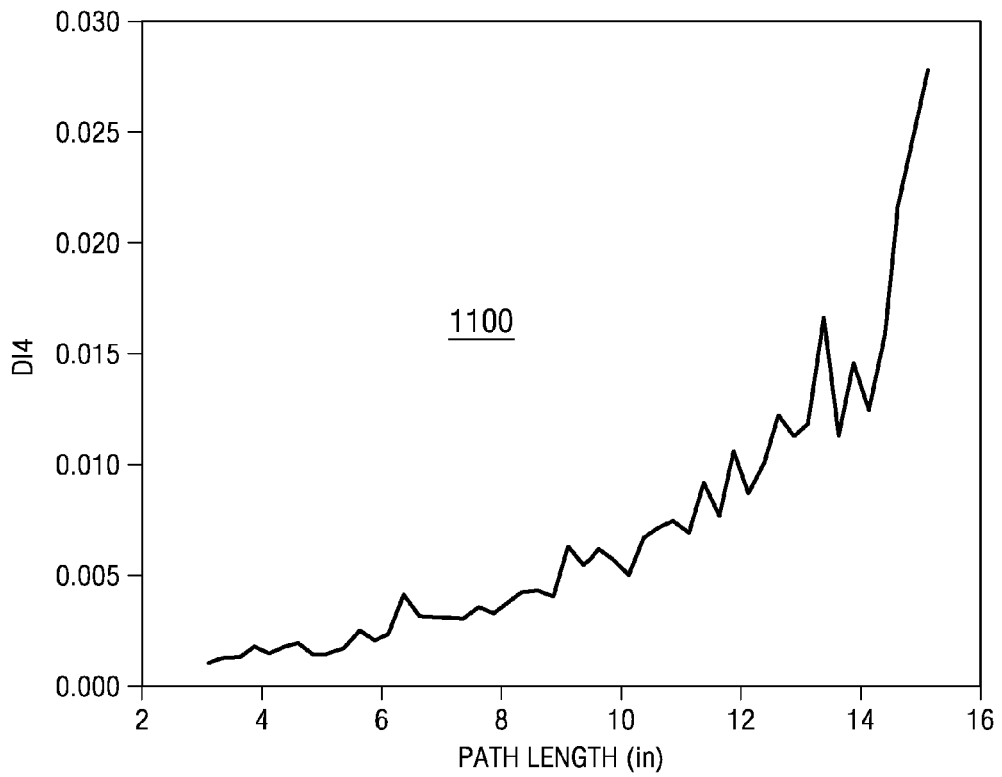
FIG. 11 is a diagram illustrating mean values generated from a model depicted in accordance with an advantageous embodiment.

With reference now to FIG. 11, a diagram illustrating the dependence of the mean values of $D_4$ on the path length is depicted in accordance with an advantageous embodiment. In graph 1100, the x axis represents path length, while the y axis represents the mean value of the dissimilarity index.

Figure 12:
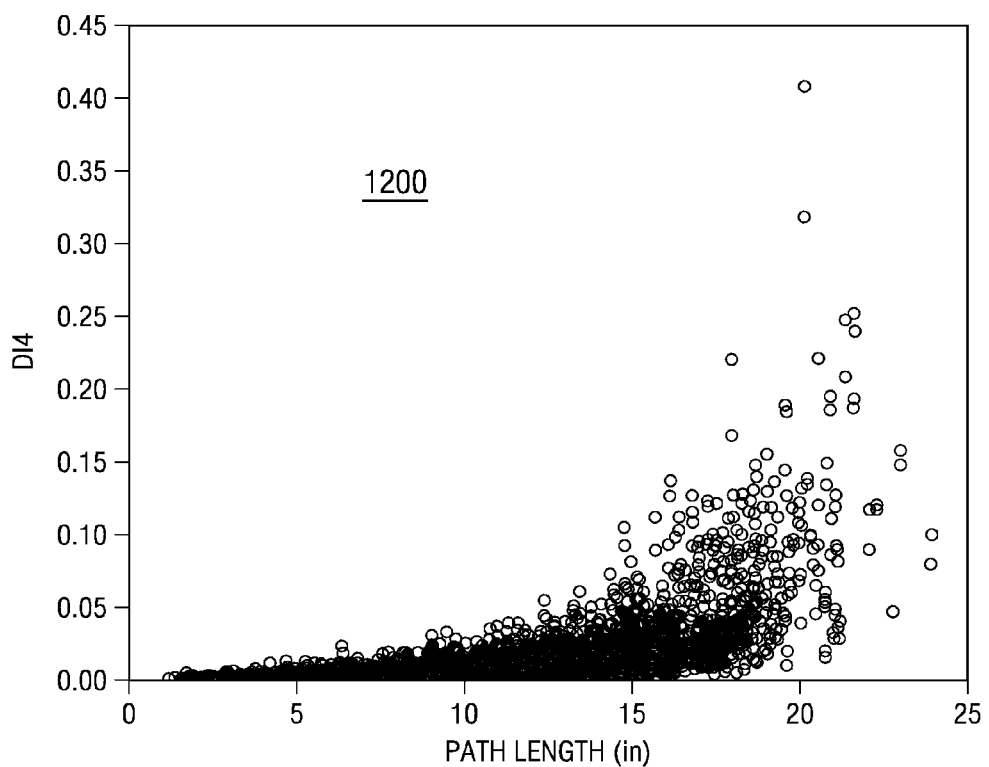
FIG. 12 is a scatter diagram of dissimilarity indices generated from a model depicted in accordance with an advantageous embodiment.

Turning now to FIG. 12, a scatter diagram of dissimilarity indices generated using dissimilarity index equation $D_4$ is depicted in accordance with an advantageous embodiment. In graph 1200, the x axis represents path length, while the y axis represents the dissimilarity index value of $D_4$. These results also illustrate a dependency on path length in which the dissimilarity index values increase exponentially as a function of path length.

Figure 13:
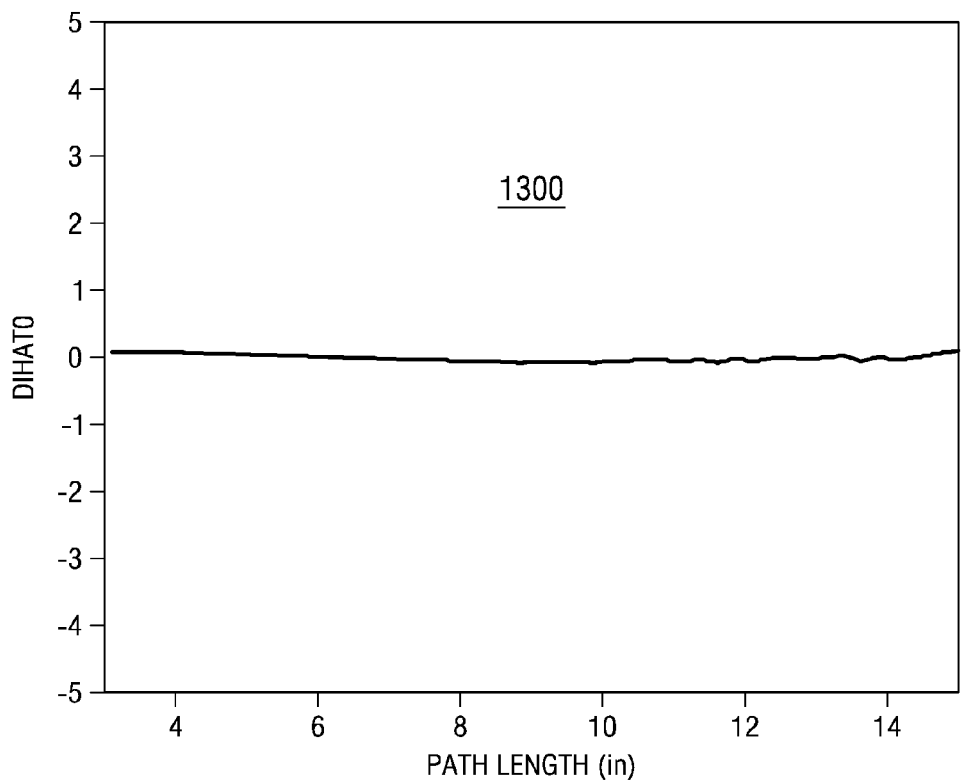
FIG. 13 is a graph illustrating mean values generated from a model depicted in accordance with an advantageous embodiment.

With reference now to FIG. 13, a graph illustrating mean values of dissimilarity indices is depicted in accordance with an advantageous embodiment. Graph 1300 illustrates values generated from dissimilarity index equation $D_0$, in which the values are transformed to compensate for the exponential dependence on path length. In graph 1300, the x axis represents path length, while the y axis represents the mean values for the dissimilarity index.

Figure 14:
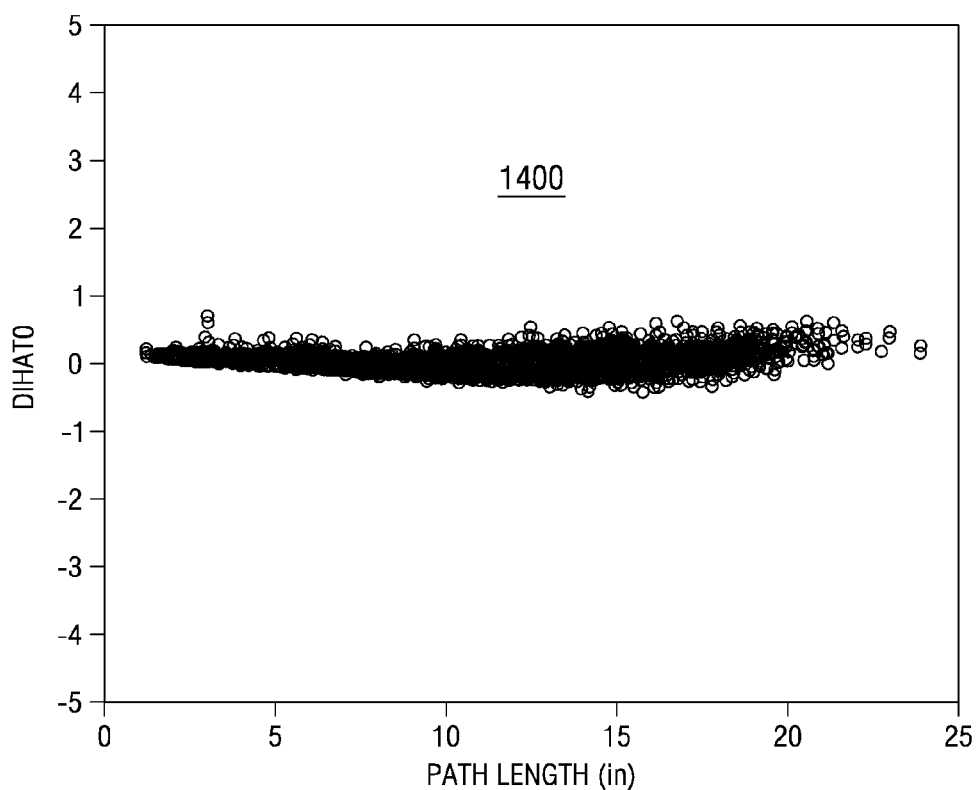
FIG. 14 is a scatter diagram of dissimilarity indices depicted in accordance with an advantageous embodiment.

With reference now to FIG. 14, a scatter diagram of dissimilarity indices is depicted in accordance with an advantageous embodiment. In graph 1400, the x axis represents the path length while the y axis represents the dissimilarity index value. In graphs 1300 and 1400, index values generated from dissimilarity index equation $D_0$ have been transformed to compensate for the exponential dependence on the path length.

Figure 15:
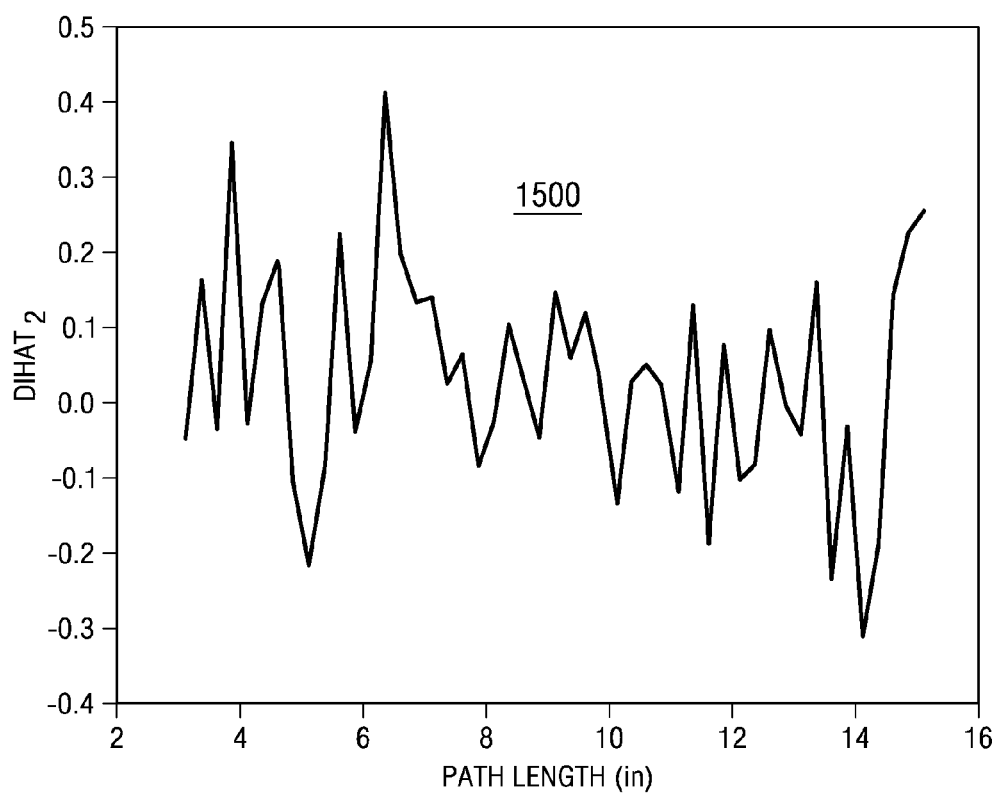
FIG. 15 is a graph illustrating mean values generated from a model depicted in accordance with an advantageous embodiment.

With reference now to FIG. 15, a graph illustrating mean values of the dissimilarity index equation $D_2$ after transformation to compensate for its exponential dependence on path length is depicted in accordance with an advantageous embodiment. In graph 1500, the x axis represents the path length, while the y axis represents the mean value for the transformed dissimilarity index for a particular path length.

Figure 16:
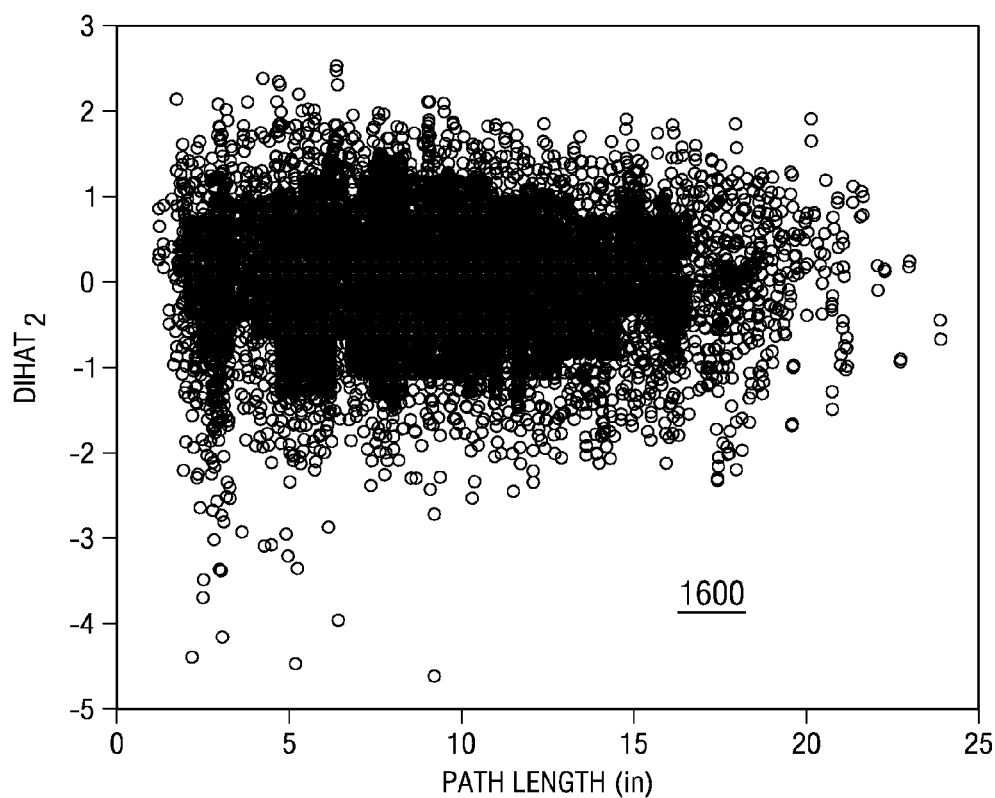
FIG. 16 is a scatter diagram illustrating values generated from a model depicted in accordance with an advantageous embodiment.

With reference now to FIG. 16, a scatter diagram illustrating values generated from dissimilarity index equation $D_2$ after transformation to compensate for its dependence on length is depicted in accordance with an advantageous embodiment. In graph 1600, the x axis represents the path length, while the y axis represents the index value. Graph 1500 and graph 1600 illustrates data generated from dissimilarity index equation $D_2$, in which compensation for path length has been performed.

Figure 17:
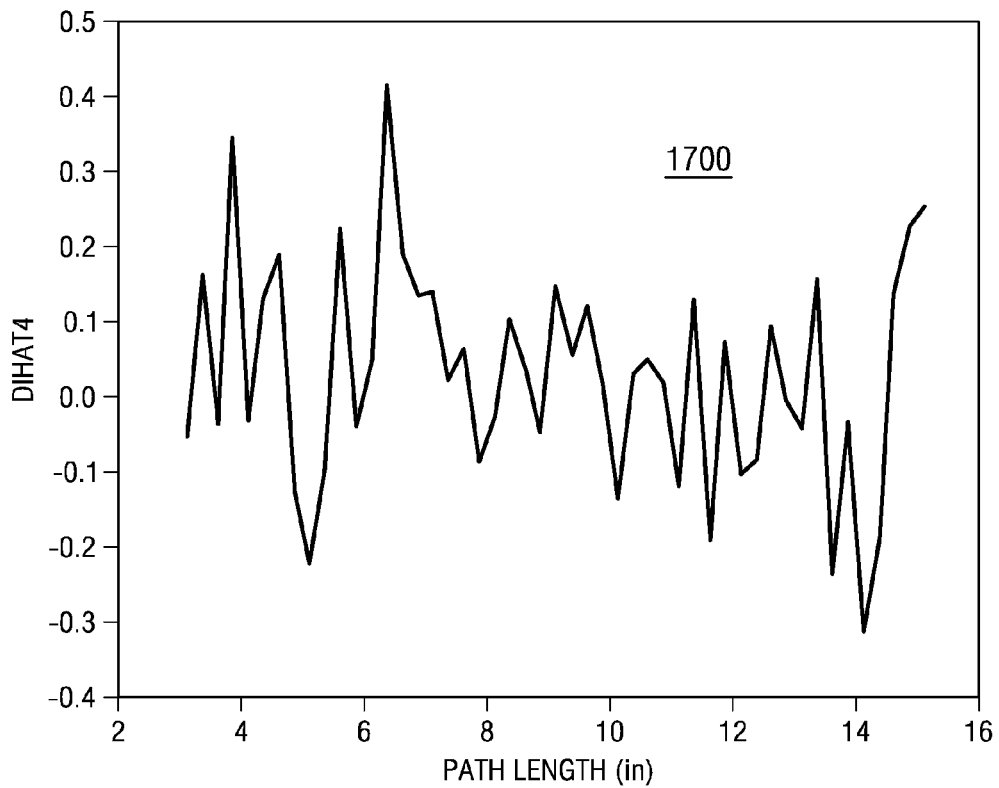
FIG. 17 is a graph illustrating mean values generated from a model depicted in accordance with an advantageous embodiment.

With reference now to FIG. 17, a graph illustrating mean values generated from dissimilarity index equation $D_4$ after compensation for its dependence on path length is depicted in accordance with an advantageous embodiment. In graph 1700, the x axis represents path length, while the y axis represents the mean value for the dissimilarity index.

Figure 18:
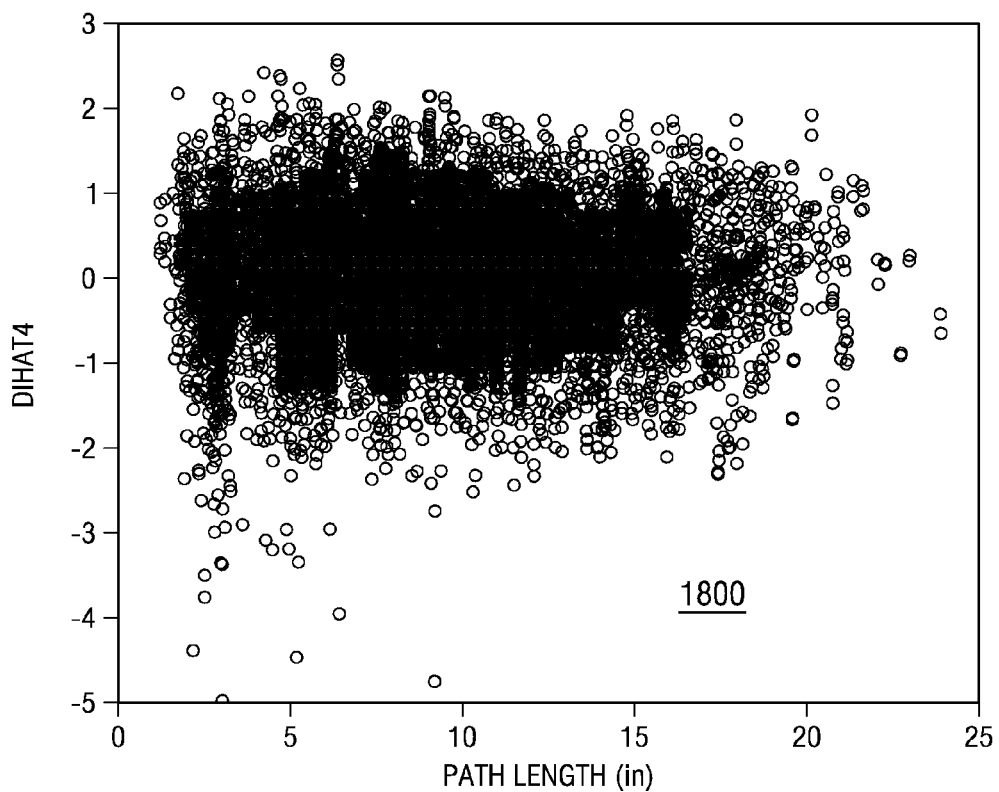
FIG. 18 is a scatter diagram of dissimilarity indices generated from a model depicted in accordance with an advantageous embodiment.

With reference now to FIG. 18, a scatter diagram of dissimilarity indices generated from dissimilarity index equation $D_4$ generated from a model after compensation for its dependence on path length is depicted in accordance with an advantageous embodiment. The x axis in graph 1800 represents the path length, while the y axis represents the dissimilarity index value. The values illustrated in graphs 1000 and 1800 are generated from dissimilarity index equation $D_4$, in which a transformation has been performed to compensate for the path length.

In order to perform a transformation to compensate for path length, the dissimilarity index is modeled as follows:

$$D(i,j)=\beta e^{l(i,j)\alpha} \qquad (22)$$

The parameters $\alpha$ and $\beta$ are then estimated from known values of dissimilarity indices and path lengths. The following transformation is then used:

$$\hat{D}(i,j)=\log(D(i,j))-l(i,j)\hat{\alpha}-\hat{\beta} \qquad (23)$$

where $\hat{\alpha}$ and $\hat{\beta}$ denote estimates of the parameters $\alpha$ and $\log(\beta)$, respectively. Using these transformed dissimilarity indices may result in better change or dissimilarity mapping performance.

The values of the parameters $\alpha$ and $\beta$ may change with the characteristics of the structure. However, this change should not create a problem for implementing the transformation described above. If two sets of baseline data are acquired, $\alpha$ and $\beta$ can be estimated from these sets. The estimates can then be applied to the test data acquired from the same structure at later times.

Figure 19:
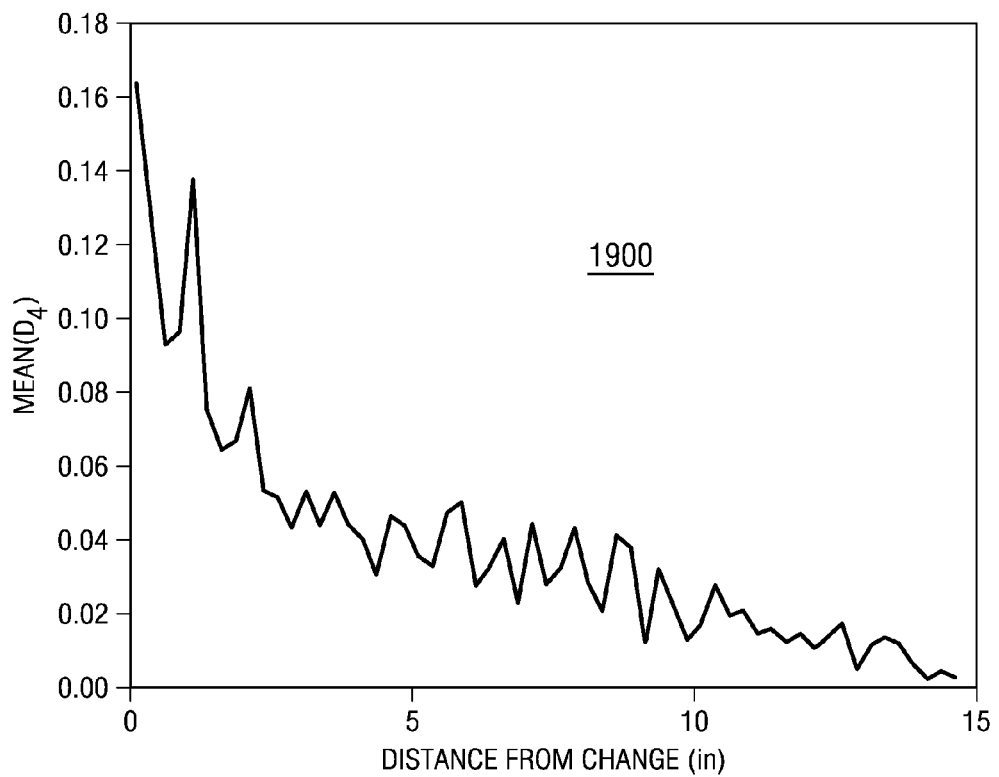
FIG. 19 is a diagram illustrating dissimilarity indices as mean values depicted in accordance with an advantageous embodiment.

With reference now to FIG. 19, a diagram illustrating mean values generated from dissimilarity index equation $D_4$ is depicted in accordance with an advantageous embodiment. In graph 1900, the x axis represents the distance from the change or dissimilarity, while the y axis represents the mean value of the dissimilarity index.

A desirable property of dissimilarity indices is that the values of these indices increase with the length of the path that goes through the area in which the change is present. In a similar fashion, the dissimilarity index will be smaller as the path is farther from the location of the change. Graph 1900 represents mean values for dissimilarity indices generated using dissimilarity index equation $D_4$.

Graph 1900 shows these values as a function of distance from the path in which change is present. The distance of the path from a change, in these illustrative examples, is the shortest length between any point on the path to any location in the area of change. The mean values illustrated in graph 1900 show a decreasing trend with increasing distance from the path to the area of changes.

In this example, the slope of a decreasing behavior is relatively high for distances up to around three inches and levels off for distances above around three inches. These results indicate that dissimilarity index equation $D_4$ may be used to detect changes that are located within around three inches of the signal path.

Figure 20:
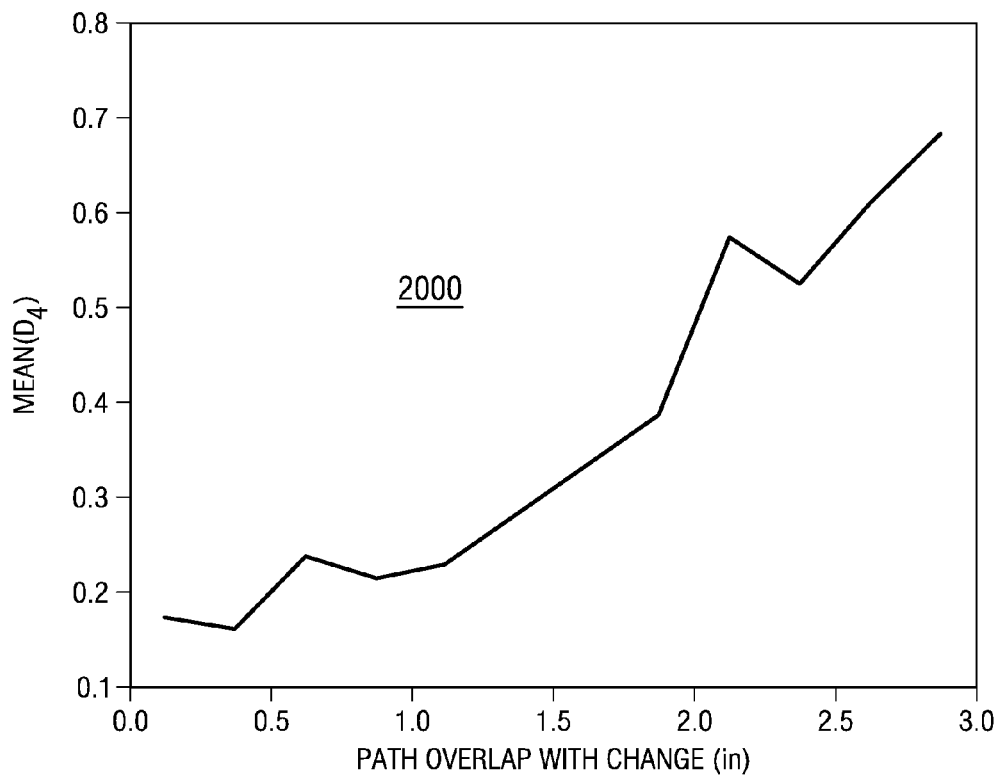
FIG. 20 is a diagram illustrating dissimilarity indices as a function of path length that overlaps a change area depicted in accordance with an advantageous embodiment.

With reference now to FIG. 20, a diagram illustrating dissimilarity indices as a function of path length that overlaps an area of change or dissimilarity is depicted in accordance with an advantageous embodiment. In graph 2000, the x axis represents the path overlap with an area of change, while the y axis represents the mean value of the dissimilarity index.

The values illustrated in graph 2000 are generated from dissimilarity index equation $D_4$. Graph 2000 shows that the behavior of the dissimilarity index exhibits an increasing relationship with overlap length. This relationship indicates that the sizing of the area of change may be identified using dissimilarity index equation $D_4$.

Figure 21:
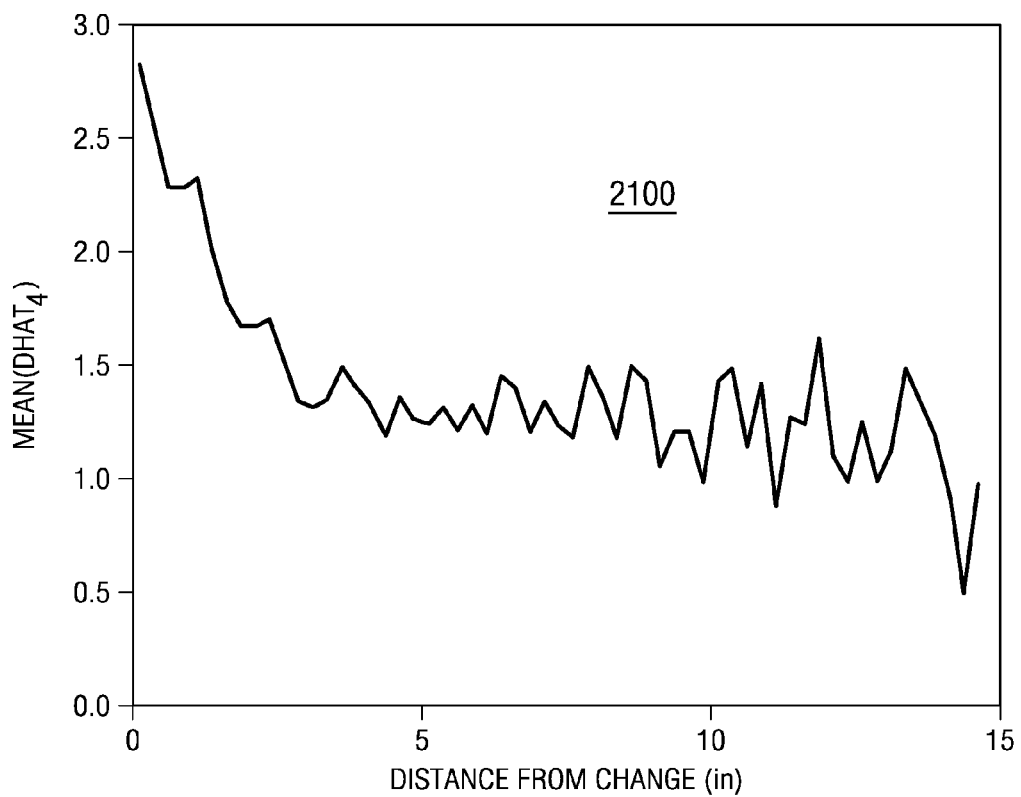
FIG. 21 is a graph illustrating mean values for a model of a structure generated after a baseline depicted in accordance with an advantageous embodiment.

With reference now to FIG. 21, graph 2100 illustrates the mean values generated using dissimilarity index equation $D_4$ for a structure generated after a baseline is compensated for its dependence on path length in accordance with an advantageous embodiment. In this example, the x axis represents path overlap with a change in a structure, while the y axis represents the mean value of the dissimilarity index.

Figure 22:
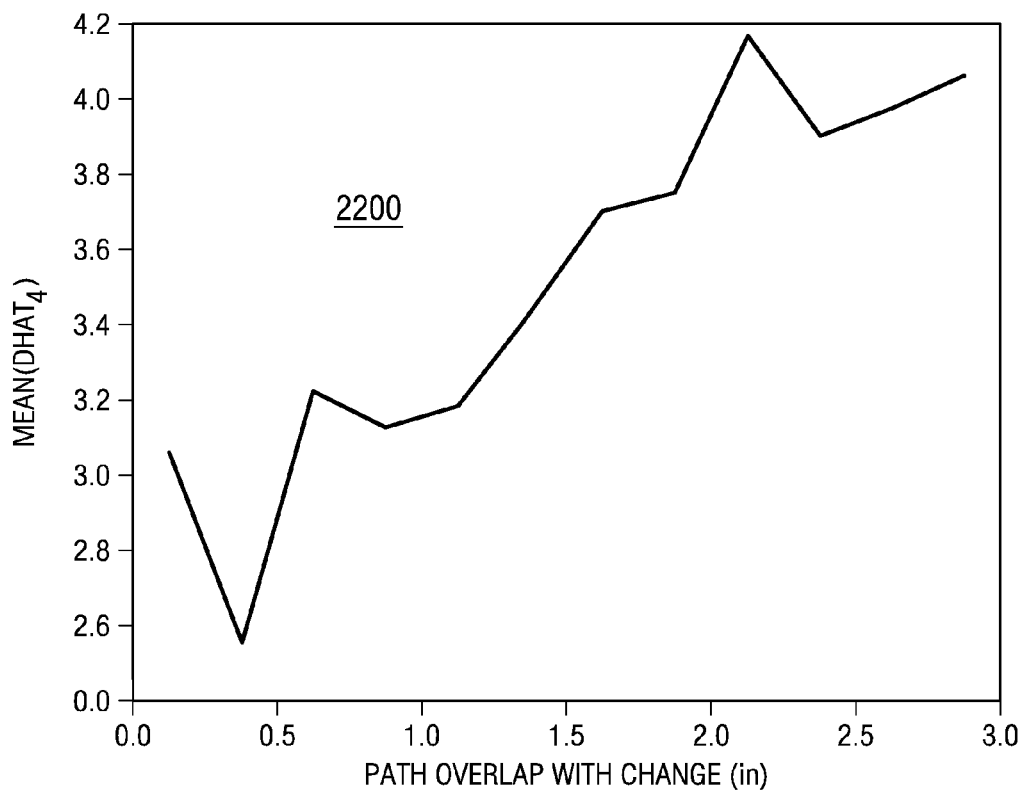
FIG. 22 is a diagram illustrating dissimilarity indices as a function of path length that overlaps a change area depicted in accordance with an advantageous embodiment.

With reference now to FIG. 22, a diagram illustrating dissimilarity indices as a function of path length that overlaps a change area is depicted in accordance with an advantageous embodiment. In graph 2200, the x axis represents the path overlap with an area of change, while the y axis represents the mean value of the dissimilarity index after compensating for its dependence on path length. In these examples, the values in graph 2200 may be generated from dissimilarity index equation $D_4$. As can be seen from this graph, these indices increase as the length of the path that goes directly through the area of change decreases and the values decrease as the distance of the path from the area of change increases.

As can be seen from the comparison of graph 1900, graph 2000, graph 2100, graph 2200, and graph 1500, the transformations performed to produce the results generated by a model independent of the path length may occur without losing the desired characteristics of the dissimilarity indices. In other words, identification of the amount of change and the distance of the change to the path may be made with transformations made to make the values independent of the path length. In these examples, the values generated from dissimilarity index equation $D_4$ increase as the length of the path goes directly through the area of change and the values decrease as the distance of the path increases with respect to the area of change.

Figure 23:
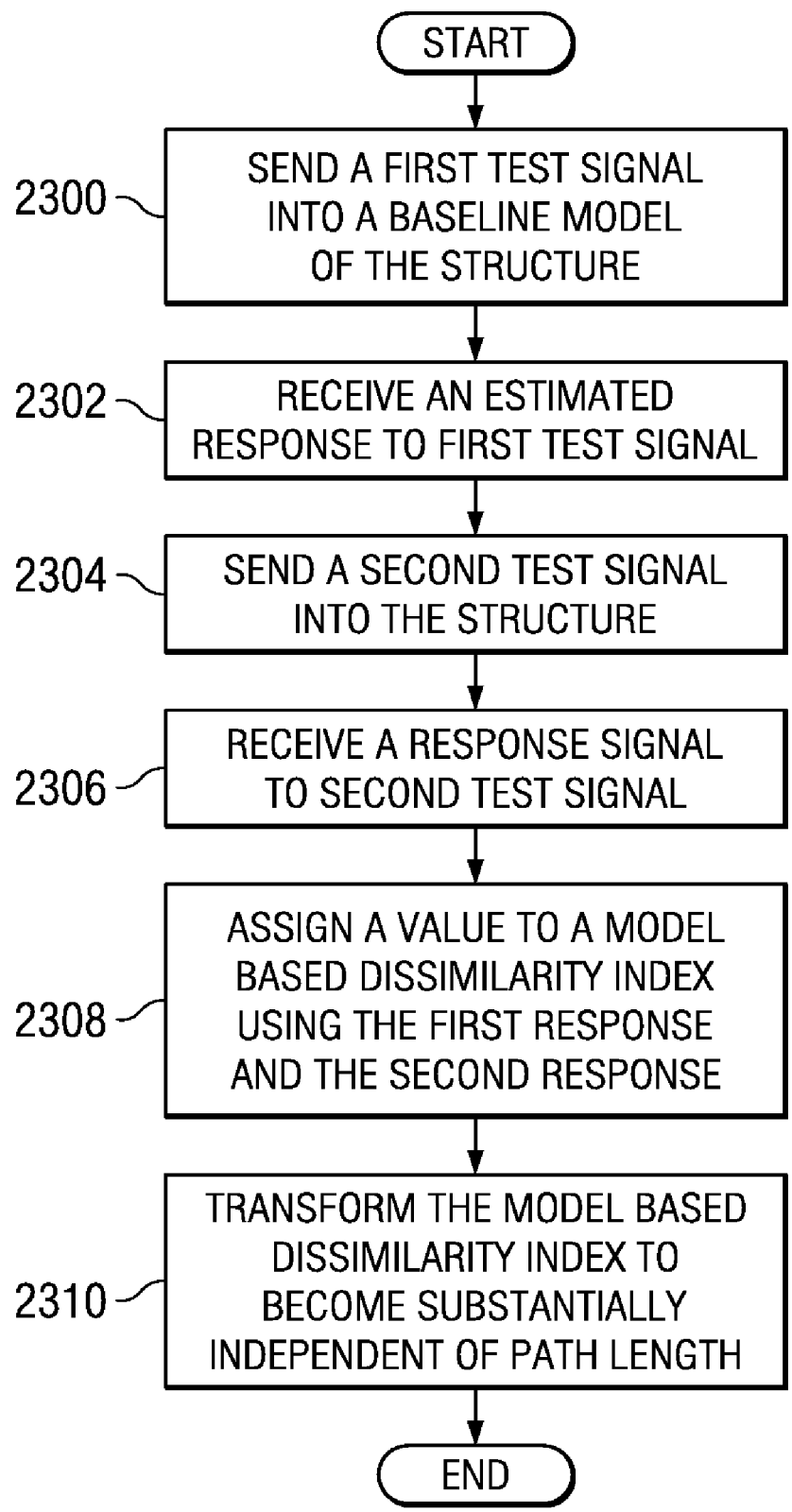
FIG. 23 is a flowchart of a process for identifying change indices for a structure depicted in accordance with an advantageous embodiment.

With reference now to FIG. 23, a flowchart of a process for identifying dissimilarity indices for a structure is depicted in accordance with an advantageous embodiment. The process illustrated in FIG. 23 may be implemented in a data processing system for a health monitoring system such as, for example, data processing system 600 in FIG. 6.

The process begins by sending a first test signal into a baseline model of the structure (operation 2300). Thereafter, the process receives an estimated response to the first test signal (operation 2302). Next, the process sends a second test signal into the structure (operation 2304). The process receives a response signal to this second test signal (operation 2306).

The process then assigns a value to a model based dissimilarity index using the first response signal and the second response signal (operation 2308). The process then transforms the model based dissimilarity index to become substantially independent of the path length (operation 2310) with the process terminating thereafter.

Although the different operations are shown in a particular order in FIG. 23, these operations may be performed in a different order depending on the particular implementation. Also, in other advantageous embodiments, the transformation of the dissimilarity index may be omitted depending on the particular implementation. Further, this process may be repeated for each transmitter and sensor pair in a particular structure.

Thus, the different advantageous embodiments provide a method, apparatus, and computer program product for identifying dissimilarity indices for a structure. The different advantageous embodiments provide a capability to overcome drawbacks in situations in which test signals are not identical for both baseline and test measurements. However, a test signal that is not identical to that used in baseline measurements will still work well because of the use of a model to define the dissimilarity indices.

In these examples, the model is expressed as an equation. With currently used measures of dissimilarity such as the root mean-square value of the difference between the responses to the baseline and test signals, such differences will introduce large variations that are not representative of changes in the structure in the dissimilarity indices.

Further, the different advantageous embodiments also provide a capability to compensate for and/or reduce path length dependent behavior that is currently present with current systems for generating dissimilarity indices. By reducing or eliminating path dependencies, the different advantageous embodiments may reduce sensor density requirements to provide the desired quality of results in structural health monitoring systems.

The different advantageous embodiments can take the form of an entirely hardware embodiment, an entirely software embodiment, or an embodiment containing both hardware and software elements. Some embodiments are implemented in software, which includes, but is not limited to, forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. An optical disk may include a compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems, remote printers, or storage devices through intervening private or public networks. Non-limiting examples, such as modems and network adapters, are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. For example, the different advantageous embodiments are illustrated by comparing a response to a baseline.

Other advantageous embodiments may compare the response to other signals other than the baseline. This baseline may be, for example, a baseline signal that is a response generated from when the structure is in an unaltered or unchanged condition.

This signal may be obtained when the structure is first manufactured or at some other point in time. For example, a signal from another time during the monitoring may be used other than the baseline signal. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for identifying dissimilarity indices for a structure, the method comprising:
    sending a first test signal into a baseline model of the structure;
    receiving a first response signal to the first test signal sent into the baseline model of the structure;
    sending a second test signal into the structure;
    receiving a second response signal to the second test signal sent into the structure;
    assigning a value to a dissimilarity index using the first response signal, the second response signal, and a dissimilarity index equation; and
    transforming the dissimilarity index to become at least substantially independent of a length of a path between a transmitter and a sensor.

2. The method of claim 1, wherein the step of sending the first test signal into the structure comprises:
    sending the second test signal into a model of the structure, wherein the model is generated from responses to signals sent into the structure and wherein the second response signal is a second estimated response signal.

3. The method of claim 1, wherein the assigning step comprises:
    calculating an average value of squared differences between the first response signal and the second response signal.

4. The method of claim 1, wherein the assigning step comprises:
    calculating the dissimilarity index using the dissimilarity index equation as follows:

$$D_0(i,j) = \frac{J_{i,j}^{(t)}}{J_{i,j}^{(b)}}$$

where $D_0(i,j)$ is the dissimilarity index, $(i, j)$ identifies an $(i, j)^{th}$ path, i is a transmitter, j is a sensor, $J_{i,j}^{(t)}$ is a normalized least-squares error associated with estimating a test response signal using the baseline model, $J_{i,j}^{(b)}$ is a normalized least-squares error associated with modeling a baseline response signal using the baseline model, t identifies a test structure, and b identifies a baseline structure.

5. The method of claim 1, wherein the assigning step comprises:

calculating the dissimilarity index using the dissimilarity index equation as follows:

$$D(i,j) = \sum_{k=0}^{P} \left(h_{i,j}^{(b)}(k) - h_{i,j}^{(t)}(k)\right)^2$$

where $D(i,j)$ is the dissimilarity index, $(i, j)$ identifies an $(i, j)^{th}$ path, i is a transmitter, j is a sensor, P identifies a maximum delay value, k identifies a number of samples, $h_{i,j}^{(b)}$ is a scaling factor with a delay of k samples for the baseline model, $h_{i,j}^{(t)}$ is a scaling factor with a delay of k samples for a model of wave propagation for the test structure, b identifies a baseline structure, and t identifies a test structure.

6. The method of claim 1, wherein the assigning step comprises:

calculating the dissimilarity index for a baseline structure and a test structure as follows:

$$D_3(i,j) = \frac{1}{2\pi}\int_{-\pi}^{\pi} \|H_{i,j}^{(b)}(\omega)X_i^{(t)}(\omega) - H_{i,j}^{(t)}(\omega)X_i^{(t)}(\omega)\|^2 d\omega$$

where $D_3(i,j)$ is a frequency-weighted version of a dissimilarity index $D_0(i,j)$, $(i, j)$ identifies an $(i,j)^{th}$ it path, i is a transmitter, j is a sensor, 3 indicates that $D_0(i,j)$ is unnormalized, $H_{i,j}^{(b)}(\omega)$ is a frequency response of a linear wave propagation model for the baseline structure, $H_{i,j}^{(b)}(\omega)$ is a frequency response of a linear wave propagation model for the test structure, $\omega$ identifies a frequency, b identifies the baseline structure, t identifies the test structure, and $X_i^t(\omega)$ is a Fourier transform of an excitation signal for an ith transmitter.

7. The method of claim 1, wherein the assigning step comprises:

calculating the dissimilarity index using the dissimilarity index equation as follows:

$$D_2(i,j) = \frac{\sum_{n=1}^{N} \left(\hat{y}_{i,j}^{(t,b)}(n) - \hat{y}_{i,j}^{(t,t)}(n)\right)^2}{\sqrt{\sum_{n=1}^{N} \left(\hat{y}_{i,j}^{(t,b)}(n)\right)^2 \sum_{n=1}^{N} (y_{i,j}^{(t,t)}(n))^2}}$$

where $$\hat{y}_{i,j}^{(t,t)}(n) = H_{i,j}^{(t)}\{x_i^{(t)}(n)\}$$

and $$\hat{y}_{i,j}^{(t,b)}(n) = H_{i,j}^{(b)}\{x_i^{(t)}(n)\}$$

where $D_2(i,j)$ is the dissimilarity index, $(i, j)$ identifies an $(i, j)^{th}$ path, i is a transmitter, j is a sensor, $\hat{y}_{i,j}^{(t,b)}(n)$ is an estimate for a test response signal obtained by processing an excitation signal using a baseline model $H_{i,j}^b$, $\hat{y}_{i,j}^{(t,t)}(n)$ is an estimate for a test response signal obtained by processing the excitation signal using a propagation model $H_{i,j}^{(t)}$ for a test structure, and $x_i^{(t)}(n)$ is the excitation signal.

8. The method of claim 1, wherein the assigning step comprises:

calculating the dissimilarity index using the dissimilarity index equation as follows:

$$D_4(i,j) = 1 - \frac{\sum_{n=1}^{N} \hat{y}_{i,j}^{(t,b)}(n)\hat{y}_{i,j}^{(t,t)}(n)}{\sqrt{\sum_{n=1}^{N} \left(\hat{y}_{i,j}^{(t,b)}(n)\right)^2 \sum_{n=1}^{N} (y_{i,j}^{(t,t)}(n))^2}}$$

where $D_4(i,j)$ is the dissimilarity index, $(i, j)$ identifies an $(i, j)^{th}$ path, i is a transmitter, j is a sensor, $\hat{y}_{i,j}^{(t,b)}(n)$ is an estimate for a test response signal obtained by processing an excitation signal using a baseline model $H_{i,j}^{(b)}$ based on the excitation signal, $\hat{y}_{i,j}^{(t,t)}(n)$ is an estimate for a test response signal obtained by processing the excitation signal using a propagation model $H_{i,j}^{(b)}$ for a test structure, and $x_i^{(t)}(n)$ is the excitation signal.

9. The method of claim 1, wherein the transforming step comprises:

transforming the dissimilarity index using the dissimilarity index equation as follows:

$$\hat{D}(i,j) = \log(D(i,j)) = l(i,j)\hat{\alpha} - \hat{\beta}$$

where $\hat{D}(i,j)$ is a transformed dissimilarity index, $(i, j)$ identifies an $(i, j)^{th}$ path, i is a transmitter, j is a sensor, $\hat{\alpha}$ and $\hat{\beta}$ are estimates of parameters that model an exponential relationship between the dissimilarity index and the length of the path between the transmitter and the sensor.

10. The method of claim 1, wherein the structure is selected from one of a mobile platform, a stationary platform, a land-based structure, an aquatic-based structure, and a space-based structure.

11. An apparatus comprising:

a structure having a plurality of components;

a set of transmitters physically associated with the plurality of components, wherein the set of transmitters is configured to send signals into the plurality of components;

a set of sensors physically associated with the plurality of components, wherein the set of sensors is configured to detect responses to the signals; and a structural health monitoring system in communication with the set of transmitters and the set of sensors, wherein the structural health monitoring system is configured to send a first test signal into a baseline structure; receive a first response signal from the baseline structure; compute a baseline propagation model for the structure; send a second test signal into a test structure; receive a second response signal to the second test signal sent into the test structure; compute a wave propagation model for the test structure; assign a value to a model-based dissimilarity index using a baseline response and a test response; and transform the dissimilarity index to become at least substantially independent of a length of a path between a transmitter and a sensor.

12. The apparatus of claim 11, wherein the structural health monitoring system is configured to process a test signal using the baseline propagation model for the structure to obtain an estimated response of the baseline structure to the test signal, and also processing the test signal with the wave propagation model for the test structure to get an estimated test response.

13. The apparatus of claim 11, wherein in assigning the value to the model-based dissimilarity index using the baseline response and test second response, the structural health monitoring system is configured to calculate an average value of the squared difference between an estimated baseline response signal, obtained by processing a test signal with the baseline propagation model for the structure, and the second response signal.

14. The apparatus of claim 11, wherein in assigning the value to the model-based dissimilarity index using the baseline response and the test response, the structural health monitoring system is configured to calculate a dissimilarity index as follows:

$$D_0(i, j) = \frac{J_{i,j}^{(t)}}{J_{i,j}^{(b)}}$$

where $D_0(i,j)$ is the dissimilarity index, $(i, j)$ identifies an $(i, j)^{th}$ path, i is a transmitter, j is a sensor, $J_{i,j}^{(b)}$ is a normalized least-squares error associated with modeling a test response using the baseline propagation model for the structure, $J_{i,j}^{(b)}$ is a normalized least-squares error associated with modeling a baseline response using the baseline propagation model for the structure, t identifies the test structure and b identifies the baseline structure.

15. The apparatus of claim 11, wherein in assigning the value to the model-based dissimilarity index using the baseline response and the test response, the structural health monitoring system is configured to calculate a dissimilarity index as follows:

$$D(i, j) = \sum_{k=0}^{P} \left(h_{i,j}^{(b)}(k) - h_{i,j}^{(t)}(k)\right)^2$$

where $D(i,j)$ is the dissimilarity index, $(i, j)$ identifies an $(i, j)^{th}$ path, i is a transmitter, j is a sensor, P identifies a maximum delay value, k identifies a number of samples, $h_{i,j}^{(b)}(k)$ is a scaling factor with a delay of k samples for the baseline propagation model for the structure, $h_{i,j}^{(t)}(k)$ is a scaling factor with a delay of k samples for the wave propagation model for the test structure, b identifies the baseline structure, and t identifies the test structure.

16. The apparatus of claim 11, wherein in assigning the value to the model-based dissimilarity index using the baseline response and the test response, the structural health monitoring system is configured to calculate a frequency-weighted value using a test signal, the baseline propagation model for the structure and the wave propagation model for the test structure as follows:

$$D_3(i, j) = \frac{1}{2\pi}\int_{-\pi}^{\pi} \|H_{i,j}^{(b)}(\omega)X_i^{(t)}(\omega) - H_{i,j}^{(t)}(\omega)X_i^{(t)}(\omega)\|^2 d\omega$$

where $D_3(i, j)$ is a frequency-weighted version of a dissimilarity index $D(i,j)$, $(i, j)$ identifies an $(i, j)^{th}$ path, i is a transmitter, j is a sensor, $H_{i,j}^{(b)}(\omega)$ is a frequency response of a linear propagation model for the baseline structure, $H_{i,j}^{t}(\omega)$ is a frequency response of a linear propagation model for the test structure, $\omega$ identifies a frequency, b identifies the baseline structure, t identifies the test structure, and $X_i^{t}(\omega)$ is a Fourier transform of the excitation signal for an ith transmitter.

17. The apparatus of claim 11, wherein in assigning the value to the model-based dissimilarity index using the baseline response and the test response, the structural health monitoring system is configured to calculate a dissimilarity index as follows:

$$D_2(i, j) = \frac{\sum_{n=1}^{N} \left(\hat{y}_{i,j}^{(t,b)}(n) - \hat{y}_{i,j}^{(t,t)}(n)\right)^2}{\sqrt{\sum_{n=1}^{N} \left(\hat{y}_{i,j}^{(t,b)}(n)\right)^2 \sum_{n=1}^{N} \left(y_{i,j}^{(t,t)}(n)\right)^2}}$$

where $$\hat{y}_{i,j}^{(t,t)}(n) = H_{i,j}^{(t)}\{x_i^t(n)\}$$

and $$\hat{y}_{i,j}^{(t,b)}(n) = H_{i,j}^{(b)}\{x_i^{(t)}(n)\}$$

where $D_2(i, j)$ is a dissimilarity index $D(i, j)$, $(i, j)$ identifies an $(i, j)^{th}$ path, i is a transmitter, j is a sensor, $\hat{y}_{i,j}^{(t,b)}(n)$ is an estimate for a test response signal obtained by processing an excitation signal using a baseline model $H_{i,j}^{b}$, $\hat{y}_{i,j}^{(t,t)}(n)$ is an estimate for a test response signal obtained by processing the excitation signal using a propagation model $H_{i,j}^{(t)}$ for a test structure, and $x_i^{(t)}(n)$ is the excitation signal.

18. The apparatus of claim 11, wherein in assigning the value to the model-based dissimilarity index using the baseline response and the test response, the structural health monitoring system is configured to calculate a dissimilarity index as follows:

$$D_4(i, j) = 1 - \frac{\sum_{n=1}^{N} \hat{y}_{i,j}^{(t,b)}(n)\hat{y}_{i,j}^{(t,t)}(n)}{\sqrt{\sum_{n=1}^{N} \left(\hat{y}_{i,j}^{(t,b)}(n)\right)^2 \sum_{n=1}^{N} \left(y_{i,j}^{(t,t)}(n)\right)^2}}$$

where $D_4(i, j)$ is the dissimilarity index, $(i,j)$ identifies the $(i,j)^{th}$ path, i is a transmitter, j is a sensor, $\hat{y}_{i,j}^{(t,b)}(n)$ is an estimate for a baseline sensor signal obtained by processing a test signal using a baseline model $H_{i,j}^{(b)}$ based on the excitation signal, $\hat{y}_{i,j}^{(t,t)}(n)$ is an estimate for a test sensor signal obtained by processing the test signal using a propagation model $H_{i,j}^{(t)}$ for the test structure, and $x_i^{(t)}(n)$ is the excitation signal.

19. The apparatus of claim 11, wherein the structural health monitoring system is further configured to transform the model-based dissimilarity index to become at least substantially independent of a length of a path between a transmitter and a sensor.

20. The apparatus of claim 11, wherein the structure is selected from one of a mobile platform, a stationary platform, a land-based structure, an aquatic-based structure, and a space-based structure.

21. A computer program product for identifying dissimilarity indices for a structure, the computer program product comprising:

a computer recordable storage medium;

program code, stored on the computer recordable storage medium, for sending a first test signal into a baseline model of the structure;

program code, stored on the computer recordable storage medium, for receiving a first response signal to the first test signal sent into the baseline model of the structure;

program code, stored on the computer recordable storage medium, for sending a second test signal into the structure;

program code, stored on the computer recordable storage medium, for receiving a second response signal to the second test signal sent into the structure;

program code, stored on the computer recordable storage medium, for assigning a value to a model-based dissimilarity index using the first response and the second response signal; and program code, stored on the computer recordable storage medium, for calculating an average value of squared differences between the first response signal and the second response signal.

* * * * *